(12) United States Patent
Park et al.

(10) Patent No.: US 12,048,052 B2
(45) Date of Patent: Jul. 23, 2024

(54) SL DRX OPERATION METHOD AND APPARATUS ACCORDING TO UE TYPE IN NR V2X

(71) Applicant: LG Electronics Inc., Seoul (KR)

(72) Inventors: Giwon Park, Seoul (KR); Seungmin Lee, Seoul (KR); Seoyoung Back, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 371 days.

(21) Appl. No.: 17/567,550

(22) Filed: Jan. 3, 2022

(65) Prior Publication Data

US 2022/0210864 A1 Jun. 30, 2022

Related U.S. Application Data

(60) Provisional application No. 63/137,623, filed on Jan. 14, 2021.

(30) Foreign Application Priority Data

| Dec. 31, 2020 | (KR) | ........................ | 10-2020-0189642 |
| Jan. 8, 2021 | (KR) | ........................ | 10-2021-0002744 |
| Jan. 14, 2021 | (KR) | ........................ | 10-2021-0005293 |
| Feb. 19, 2021 | (KR) | ........................ | 10-2021-0022235 |

(51) Int. Cl.
*H04W 76/28* (2018.01)
*H04W 4/40* (2018.01)
*H04W 28/02* (2009.01)

(52) U.S. Cl.
CPC ............ *H04W 76/28* (2018.02); *H04W 4/40* (2018.02); *H04W 28/0268* (2013.01)

(58) Field of Classification Search
None
See application file for complete search history.

(56) References Cited

U.S. PATENT DOCUMENTS

2023/0014303 A1\* 1/2023 Di Girolamo ........ H04W 72/20
2023/0066448 A1\* 3/2023 Tseng .................... H04W 76/23

FOREIGN PATENT DOCUMENTS

KR 20190039101 4/2019

OTHER PUBLICATIONS

3GPP TR 23.776 V1.0.0 (Nov. 2020), "3rd Generation Partnership Project; Technical Specification Group Services and System Aspects; Study on architecture enhancements for 3GPP support of advanced Vehicle-to-Everything (V2X) services; Phase 2 (Release 17)," Nov. 2020, 29 pages.
3GPP TS 38.321 V16.2.1 (Sep. 2020), "3rd Generation Partnership Project; Technical Specification Group Radio Access Network; NR; Medium Access Control (MAC) protocol specification (Release 16)," Sep. 2020, 151 pages.

(Continued)

*Primary Examiner* — Hong S Cho
(74) *Attorney, Agent, or Firm* — Fish & Richardson P.C.

(57) ABSTRACT

A method of operating a first apparatus 100 is proposed. The method may include, obtaining information related to whether an SL DRX operation of a second apparatus 200 is enabled and a service data unit (SDU); determining that the second apparatus 200 performs an SL DRX operation; determining an SL DRX configuration, based on a quality of service (QoS) requirement.

14 Claims, 17 Drawing Sheets

(56) References Cited

OTHER PUBLICATIONS

Intel Corporation, "On general sidelink DRX design," 3GPP TSG RAN WG2 Meeting #112-e, R2-2008978, Electronic meeting, Nov. 2-13, 2020, 6 pages.
LG Electronics Inc., "Discussion on Sidelink DRX," 3GPP TSG-RAN WG2 Meeting #112 electronic, R2-2008943, Online, Nov. 2-13, 2020, 6 pages.
PCT International Search Report in International Application No. PCT/KR2021/020379, dated Mar. 24, 2022, 6 pages (with English translation).

* cited by examiner

SL DRX OPERATION METHOD AND APPARATUS ACCORDING TO UE TYPE IN NR V2X

CROSS-REFERENCE TO RELATED APPLICATIONS

Pursuant to 35 U.S.C. § 119, this application claims the benefit of Korean Patent Applications No. 10-2020-0189642, filed on Dec. 31, 2020, No. 10-2021-0002744, filed on Jan. 8, 2021 and No. 10-2021-0005293, filed on Jan. 14, 2021, No. 10-2021-0022235, filed on Feb. 19, 2021, and U.S. Provisional Application No. 63/137,623, filed on Jan. 14, 2021, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Solutions

According to an embodiment, a method of operating a first apparatus 100 in a wireless communication system is proposed. The method may include, obtaining at least one sidelink (SL) discontinuous reception (DRX) configuration; obtaining information related to whether an SL DRX operation of a second apparatus 200 to receive a service related to a service data unit (SDU) is enabled and the SDU; determining that the second apparatus 200 performs an SL DRX operation for the service related to the SDU, based on that the information related to whether the SL DRX operation is enabled represents that an SL DRX operation of the second apparatus 200 is enabled; determining an SL DRX configuration among the at least one SL DRX configuration, based on a quality of service (QoS) requirement related to the SDU; generating a medium access control (MAC) protocol data unit (PDU) based on the SDU; and transmitting the MAC PDU to the second apparatus 200 in an active time of the SL DRX configuration.

Effects of the Disclosure

The user equipment (UE) may efficiently perform SL communication.

DESCRIPTION OF EXEMPLARY EMBODIMENTS

Figure 1:
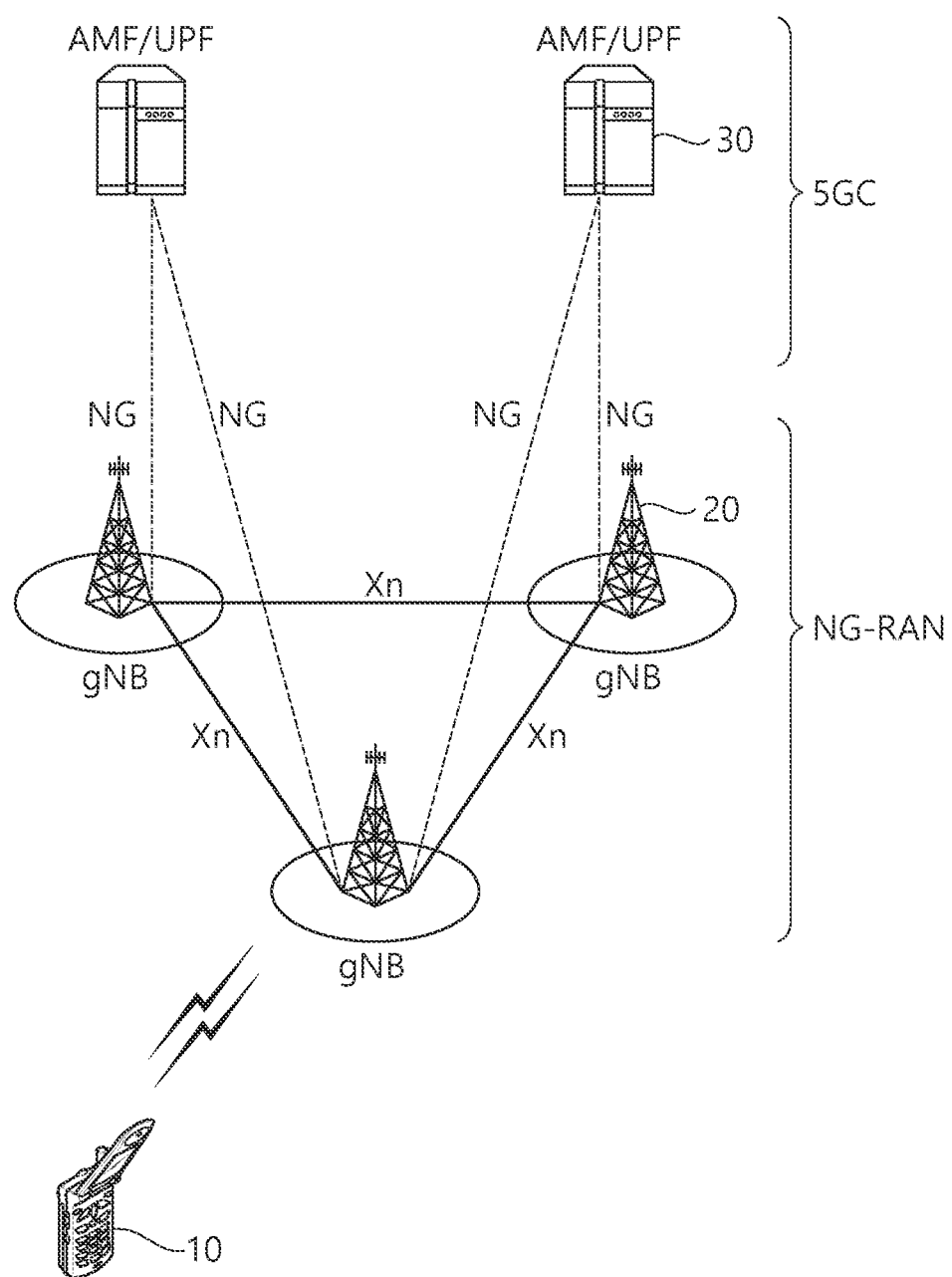
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, reference may be made to a wireless communication standard document published before the present specification is filed.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
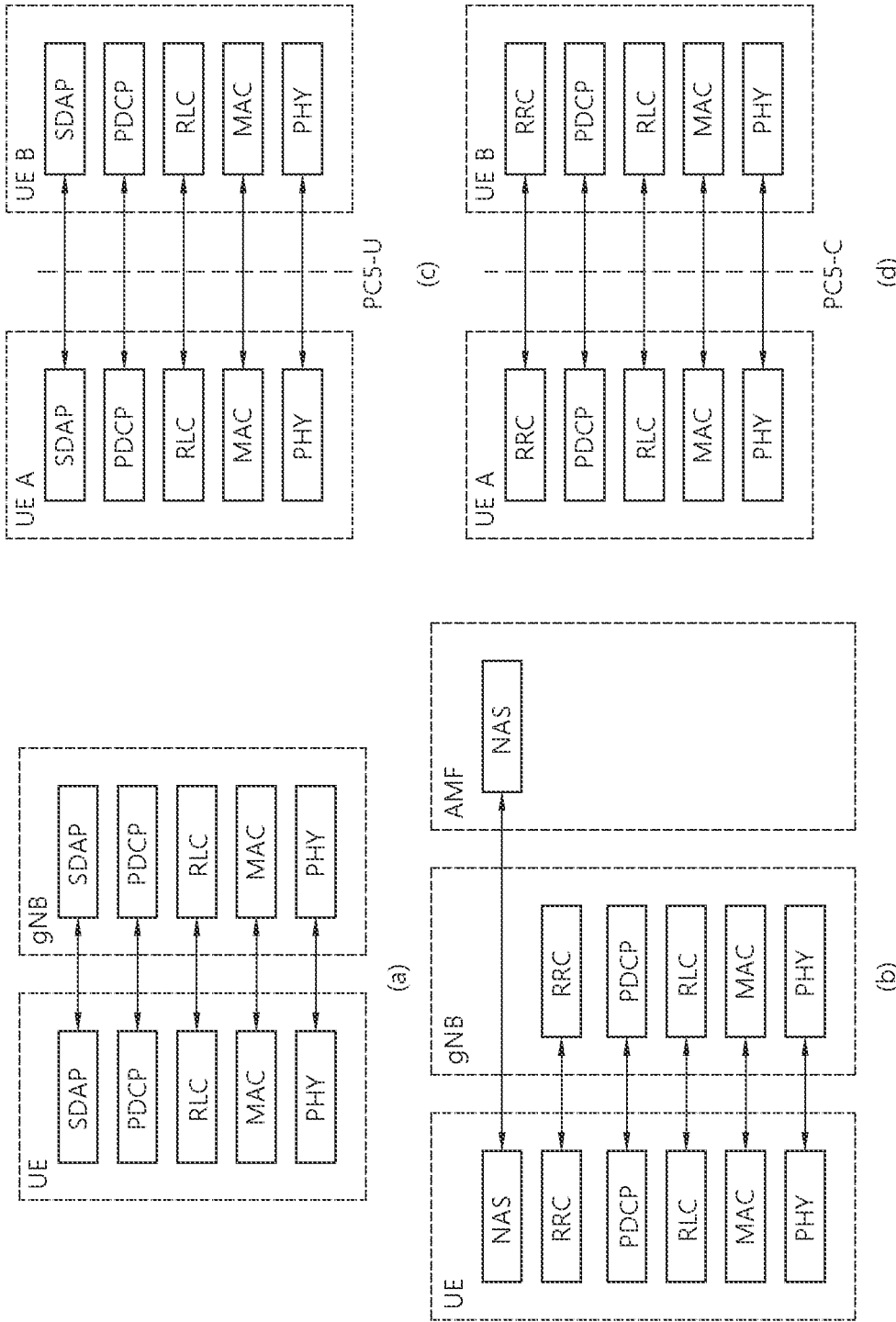
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
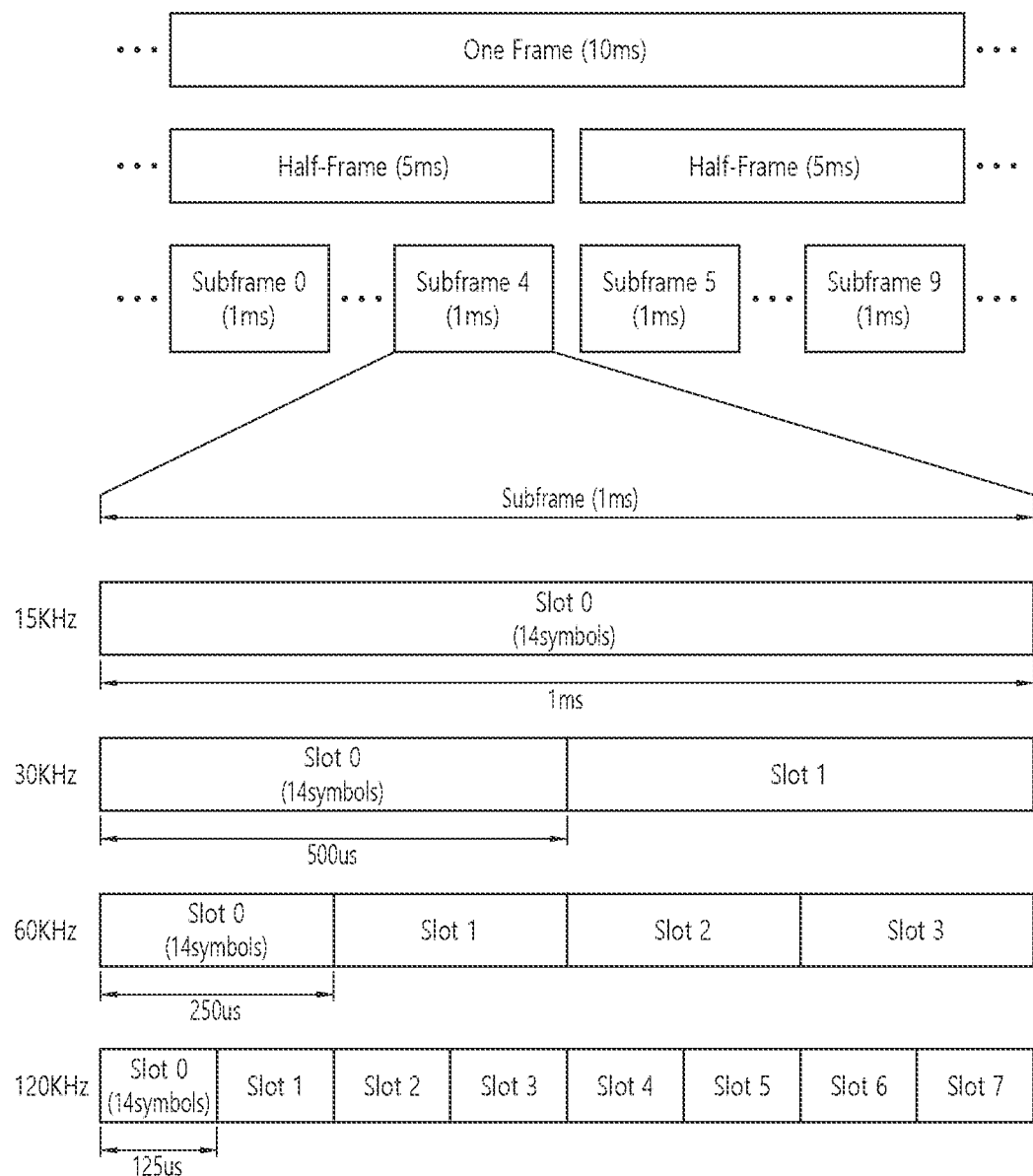
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 4:
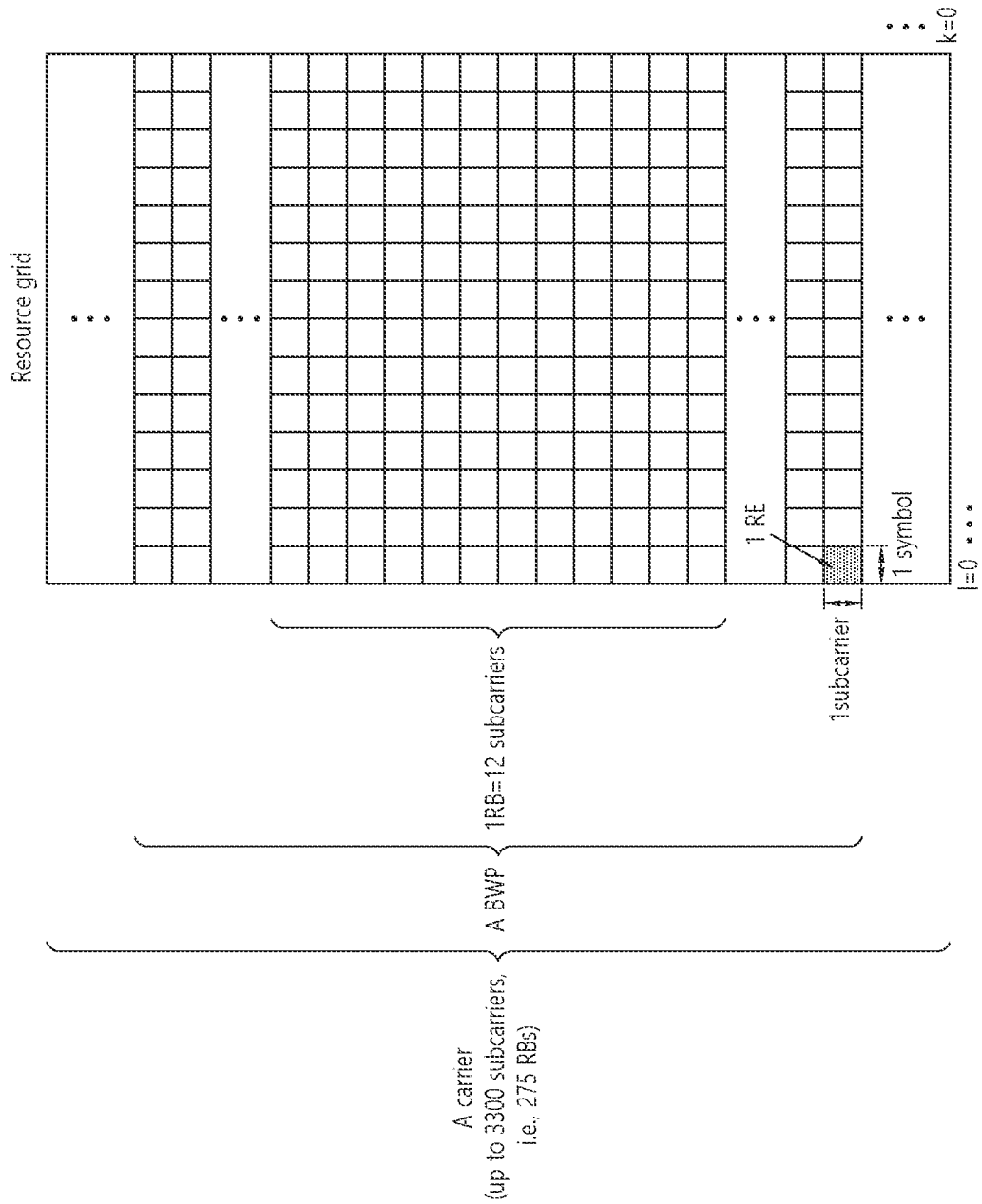
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
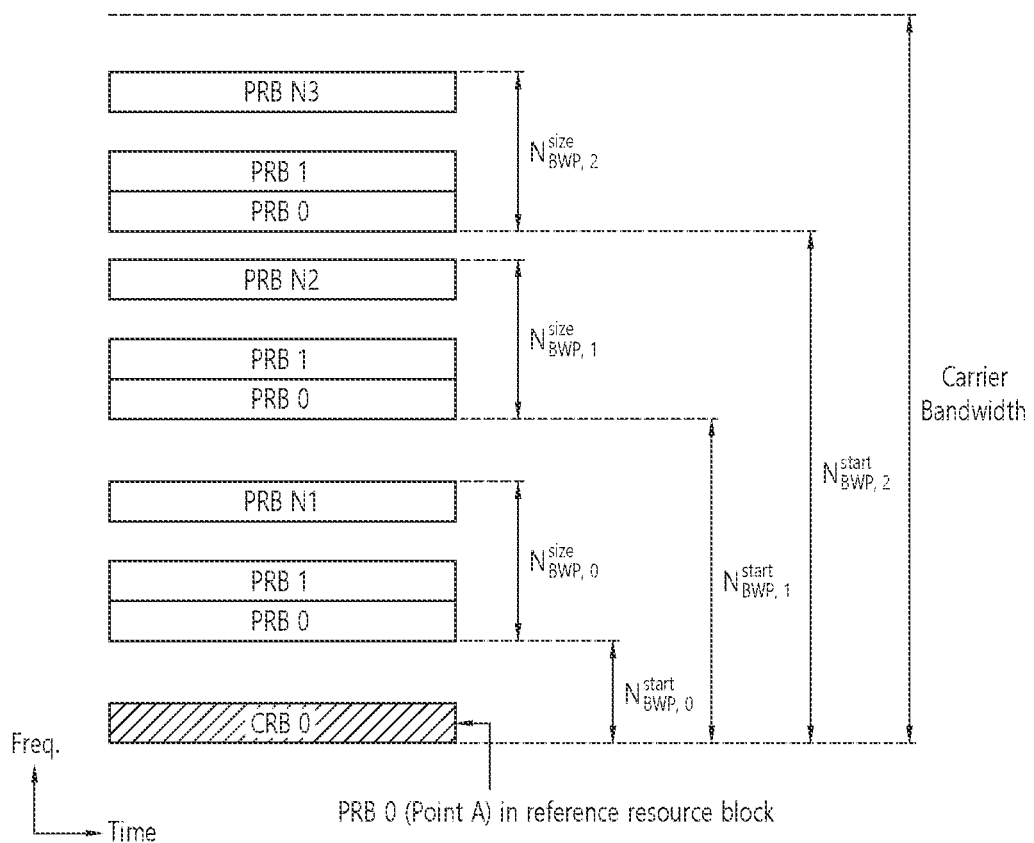
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
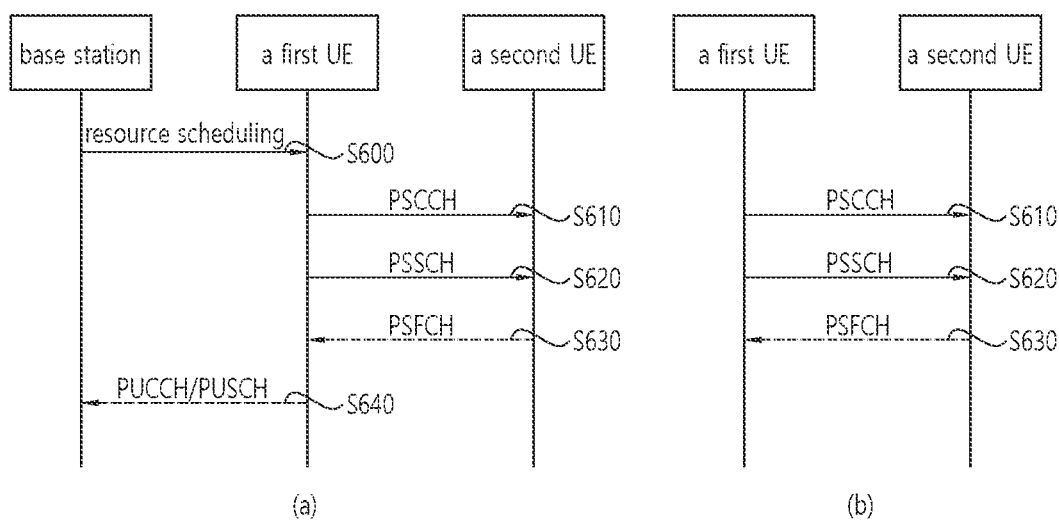
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
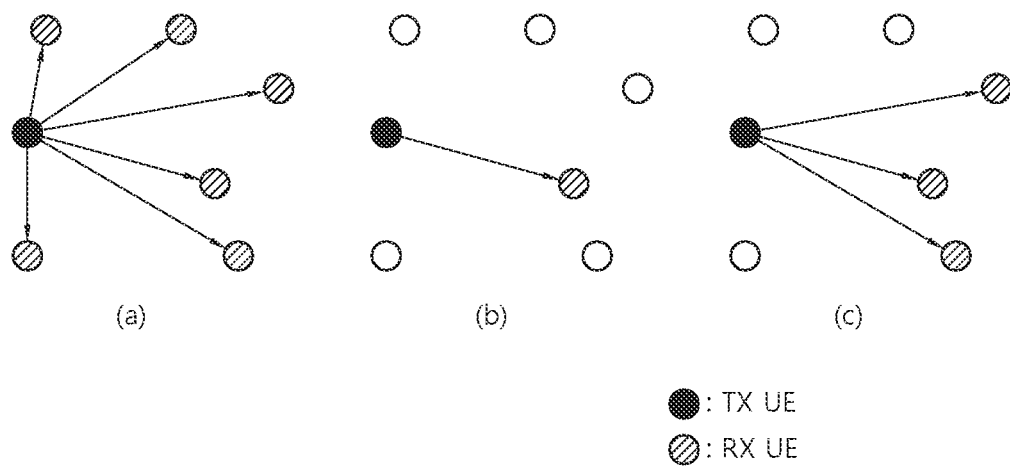
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

In this specification, the wording "configured or defined" may be interpreted as being (pre) configured (via predefined signaling (e.g., SIB, MAC signaling, RRC signaling)) from a base station or a network. For example, "A may be configured" may include "that a base station or network (in advance) configures/defines or informs A for a UE". Alternatively, the wording "configured or defined" may be construed as being configured or defined in advance by the system. For example, "A may be configured" may include "A is configured/defined in advance by the system".

On the other hand, a power saving operation of a UE was not supported in NR V2X of Release 16, and a power saving operation of a UE (e.g., power saving UE) is scheduled to be supported from Release 17 NR V2X.

In the conventional NR resource allocation mode 2 operation, when there are multiple MAC PDUs to be transmitted, a UE may perform resource reservation in a plurality of periods. In addition, the UE may transmit the MAC PDU by using one of the resources reserved in a plurality of periods for each MAC PDU transmission. And, the UE may cancel the first selected resource (the initially selected resource is indicated in SCI, and the SCI is transmitted to a receiving UE) and perform a resource reselection process, by triggering pre-emption, congestion control, and UL/SL prioritization based resource reselection. And, the UE may transmit the reselected resource to the receiving UE by instructing the SCI again. For example, if a receiving UE is a power saving UE, although the receiving UE is a power saving UE, there may be a problem in that it has to operate in an active time, since the receiving UE needs to receive not only the initial SCI (the SCI indicated by the resource initially selected by a transmitting UE) transmitted by the transmitting UE but also the additional SCI (SCI indicating the resource reselected by the transmitting UE).

Accordingly, accordingly, in the embodiment(s) of the present disclosure, a method of operating SL DRX of a UE according to a UE type is proposed. In the following description, 'when, if, in case of' may be replaced with 'based on'.

For example, a P-UE described in the present disclosure may refer to a power saving UE that performs a power saving operation (e.g., SL DRX operation), and a V-UE may refer to a vehicle UE that does not perform a power saving operation.

Proposal 1. Operation Method According to a Type of a Packet Received by a Receiving UE (the UE Receiving SL Data)

According to an embodiment of the present disclosure, when an SDU of a V-UE and an SDU of a P-UE are MUXed together in a MAC PDU transmitted by a transmitting UE (the UE transmitting SL data) to a receiving UE (when the MAC PDU includes service data (e.g., PSID, ITS-AID or destination L(layer)2 ID) for the V-UE and service data (e.g., PSID, ITS-AID or destination L(layer)2 ID) for the P-UE), or when a transmitting UE has a destination L2 ID mapped to a service type (PSID, ITS-AID) for a P-UE and a destination L2 ID mapped to a service type (PSID, ITS-AID) for a V-UE at the same time, the following operation of the transmitting UE is proposed.

According to an embodiment of the present disclosure, when an SDU of a V-UE and an SDU of a P-UE are MUXed together in a MAC PDU transmitted by a transmitting UE to a receiving UE, it is possible to prevent the transmitting UE from triggering resource reselection based on preemption, congestion control, and UL/SL prioritization (an operation of dropping the transmission with the lower transmission priority, when UL transmission and SL transmission occur at the same time. That is, the operation of transmitting the data with the higher transmission priority first.) (or, SL/SL: an operation of dropping the sidelink transmission with the lower transmission priority, when there are multiple SL transmissions at the same time. That is, the operation of transmitting the data with the higher transmission priority first.), in the process of transmitting the MAC PDU or in the process of selecting a transmission resource for transmitting the MAC PDU. That is, since the SDU received by the P-UE is included in the SL data transmitted by the transmitting UE, through the embodiment, it is possible to prevent a resource reselection operation based on preemption, congestion control, and UL/SL (or SL/SL) prioritization from being triggered, so that the receiving UE does not perform the operation of additionally receiving the SCI, which is an operation that can reduce the power saving effect of the P-UE, in the process of the transmitting UE transmitting the MAC PDU or in the process of selecting a transmission resource for transmitting the MAC PDU.

According to an embodiment of the present disclosure, when a MAC PDU transmitted by a transmitting UE to a receiving UE includes service (For example, PSID, ITS-AID or Destination L2 ID) data for a V-UE and service (For example, PSID, ITS-AID or Destination L2 ID) data for a P-UE, alternatively, when the transmitting UE has a destination L2 ID mapped to a service type (PSID, ITS-AID) for a P-UE and a destination L2 ID mapped to a service type (PSID, ITS-AID) for a V-UE at the same time, a method in which SL data (PSCCH/PSSCH) transmission is dropped at a transmission resource location indicated in a prior SCI before resource reselection is triggered is proposed, even if resource reselection based on preemption, congestion control and UL/SL (or SL/SL) prioritization is not triggered in the process of the transmitting UE transmitting the MAC PDU or in the process of selecting a transmission resource for transmitting the MAC PDU.

According to an embodiment of the present disclosure, when an SDU of a V-UE and an SDU of a P-UE are MUXed together in a MAC PDU transmitted by a transmitting UE to a receiving UE (when the MAC PDU includes service data (e.g., PSID, ITS-AID or destination L(layer)2 ID) for the V-UE and service data (e.g., PSID, ITS-AID or destination L(layer)2 ID) for the P-UE), or when a transmitting UE has a destination L2 ID mapped to a service type (PSID, ITS-AID) for a P-UE and a destination L2 ID mapped to a service type (PSID, ITS-AID) for a V-UE at the same time, a periodic resource reservation operation of the transmitting UE is proposed as follows.

For example, in the conventional Release 16 NR V2X operation, a transmitting UE may perform a periodic resource reservation operation as follows. For example, when a transmitting UE performs a transmission resource reservation, since 5 transmission resources are required for transmission of a plurality of MAC PDUs constituting the same TB, when the transmitting UE selects 5 transmission resources, 5 transmission resources can be selected at the time of 1st resource selection. And, for example, the five transmission resources may be reserved through four SCIs as follows. For example, according to the current MAC operation, a maximum of 3 transmission resources can be reserved through one SCI, and 5 transmission resources can be reserved in a chain format as follows.

Reserved resources indicated in 1st SCI: 1st resource for 1st transmission, 2nd resource for 2nd transmission, 3rd resource for 3rd transmission Reserved resources indicated in 2nd SCI: 2nd resource for 2nd transmission, 3rd resource for 3rd transmission, 4th resource for 4th transmission Reserved resources indicated in 3rd SCI: 3rd resource for 3rd transmission, 4th resource for 4th transmission, last resource for last (5th) transmission Reserved resources indicated in 4th SCI: 4th resource for 4th transmission, last resource for last (5th) transmission Reserved resource indicated in 5th SCI: Last resource for last (5th) transmission That is, for example, the operation of a transmitting UE to reserve the next transmission resource through SCI was supported in the conventional NR V2X transmitting UE operation. For example, periodic transmission resource reservation was supported by including resource reservation information and period information in SCI.

According to an embodiment of the present disclosure, a method is proposed so that a transmitting UE can perform periodic transmission resource reservation at least in the SL DRX on-duration timer operation period of a receiving UE. For example, a transmitting UE may also perform periodic transmission resource reservation in the active time within the SL DRX inactivity time period ((section excluding the SL DRX on-duration timer in the SL DRX cycle, that is, SL DRX off-duration)) together with the SL DRX on-duration timer operation period, and may transmit only packets in which the intended receiving UE is a V-UE in the SL DRX inactivity time period. For example, when an intended receiving UE is a V-UE, the receiving UE checks periodic transmission resource reservation information included in the SCI transmitted by a transmitting UE and may recognize that there is SL data transmitted to it in the SL DRX inactive period.

According to an embodiment of the present disclosure, when only an SDU of a P-UE is MUXed in a MAC PDU transmitted by a transmitting UE to the receiving UE (when a MAC PDU includes service (For example, PSID, ITS-AID, or destination L2 ID) data for a P-UE), or when a transmitting UE has a destination L2 ID mapped with a service type (PSID, ITS-AID) for a P-UE, the following operation of the transmitting UE is proposed.

According to an embodiment of the present disclosure, when only an SDU of a P-UE is MUXed in a MAC PDU transmitted by a transmitting UE to the receiving UE (when a MAC PDU includes service (For example, PSID, ITS-AID, or destination L2 ID) data for a P-UE), or when a transmitting UE has a destination L2 ID mapped with a service type (PSID, ITS-AID) for a P-UE, the transmission UE may not trigger resource reselection based on preemption, congestion control, and UL/SL (or SL/SL) prioritization, in the process of the transmitting UE transmitting the MAC PDU or in the process of selecting a transmission resource for transmitting the MAC PDU. That is, for example, because only an SDU received by a P-UE is included in the SL data transmitted by the transmitting UE, to prevent the receiving UE from additionally receiving the SCI, which is an operation that can reduce the power saving effect of the P-UE, a resource reselection operation based on preemption, congestion control, and UL/SL (or SL/SL) prioritization may not be triggered, in the process of the transmitting UE transmitting the MAC PDU or in the process of selecting a transmission resource for transmitting the MAC PDU.

According to an embodiment of the present disclosure, when only an SDU of a P-UE is MUXed in a MAC PDU transmitted by a transmitting UE to the receiving UE (when a MAC PDU includes service (For example, PSID, ITS-AID, or destination L2 ID) data for a P-UE), or when a transmitting UE has a destination L2 ID mapped with a service type (PSID, ITS-AID) for a P-UE, even if preemption, congestion control, and resource reselection based on UL/SL (or SL/SL) prioritization is not triggered in the process of transmitting the MAC PDU or in the process of selecting a transmission resource for transmitting the MAC PDU, a method is proposed so that SL data (PSCCH/PSSCH) transmission in the transmission resource location indicated in the previous SCI is dropped before resource reselection is triggered.

According to an embodiment of the present disclosure, a transmitting UE may cause periodic transmission resource reservation to be performed only in an SL DRX on-duration timer period of a receiving UE (P-UE). That is, for example, so that a receiving UE (P-UE) can wake up only in an SL DRX on-duration period, a transmitting UE may perform transmission resource reservation only in an SL DRX on-duration timer period.

Alternatively, for example, a method is proposed in which a transmitting UE performs periodic transmission resource reservation at least in an SL DRX on-duration timer operation period of a receiving UE. That is, for example, a transmitting UE may perform periodic transmission resource reservation in an SL DRX inactivity time period of a receiving UE as well as an SL DRX on-duration period of the receiving UE, and the receiving UE (P-UE) may receive SL data transmitted by the transmitting UE by waking up in the periodic transmission resource reservation period indicated by the transmitting UE even in its SL DRX inactivity time period.

According to an embodiment of the present disclosure, when only an SDU of a V-UE is MUXed in a MAC PDU transmitted by a transmitting UE to a receiving UE (when a MAC PDU includes service (For example, PSID, ITS-AID, or destination L2 ID) data for a V-UE) or when a transmitting UE has a destination L2 ID mapped with a service type (PSID, ITS-AID) for a V-UE, in a process in which the transmitting UE transmits a MAC PDU or selects a transmission resource for transmitting a MAC PDU, resource reselection based on preemption, congestion control, and UL/SL (or SL/SL) prioritization may be triggered.

According to an embodiment of the present disclosure, when a transmitting UE performs resource selection based on partial sensing or random selection in an SL resource pool (for example, transmission normal pool), the transmitting UE may indicate that resource selection based on partial sensing or random selection is being performed (or not being performed) through SCI.

For example, a receiving UE may consider that a transmitting UE considers itself as a power saving UE and does not trigger resource reselection based on re-evaluation, preemption and congestion control, and UL/SL (or SL/SL) prioritization, and may perform SL DRX operation, in the process of transmitting a MAC PDU or in the process of selecting a transmission resource for transmitting the MAC PDU, when the receiving UE confirms that SCI received from the transmitting UE indicates that the transmitting UE performs resource selection based on partial sensing or random selection. That is, for example, the receiving UE may determine that the transmitting UE will transmit SL data only in the resource section reserved in the SCI currently received by the receiving UE, and may receive SL data transmitted by the transmitting UE by waking up only in the resource section reserved in the SCI. For example, the receiving UE may operate in a sleep mode between a plurality of resource reservation intervals.

For example, when a receiving UE confirms that it is indicated in SCI received from a transmitting UE that the transmitting UE does not perform resource selection based on partial sensing or random selection (that is, performing resource selection based on full sensing), the receiving UE may perform an SL DRX operation while considering that re-evaluation, preemption and congestion control, and resource reselection based on UL/SL (or SL/SL) prioritization have been triggered, in the process of the transmitting UE considering itself as a V-UE and transmitting a MAC PDU or in the process of selecting a transmission resource for transmitting the MAC PDU. That is, for example, the receiving UE may assume an SL data transmission can be performed in a section other than the reserved resource section in the SCI currently received by the receiving UE, may monitor SCI indicating a newly reserved transmission resource which is reserved after the transmitting UE selects the new transmission resource, by operating in the active mode during a period of a specific slot before and after the transmission resource reservation period indicated in the current SCI.

According to an embodiment of the present disclosure, when a transmitting UE multiplexes a MAC PDU, and when an SDU is transmitted from a V2X layer to an AS layer, a method is proposed so that an identifier capable of distinguishing whether it is an SDU for a P-UE or an SDU for a V-UE is transmitted, so that it can be distinguished that whether a MAC SDU MUXed in the MAC PDU is a MAC SDU related to a service for a P-UE (for example, PSID, ITS-AID), or a MAC SDU related to a service for a V-UE (for example, PSID, ITS-AID). For example, the identifier is an SDU service type identifier, that is, an identifier transmitted together when SDU is transmitted from the V2X layer to the AS layer, and it may be an identifier used for identification of the service type of the SDU (service for P-UE, or service for V-UE).

Alternatively, for example, by mapping a UE type (P-UE or V-UE) to an SL logical channel (SL LCH) or an SL logical channel group (SL LCG), when a MAC layer performs a logical channel prioritization (LCP) operation for generating a MAC PDU, the LCH linked to a sidelink data (MAC SDU) and a mapped UE type (P-UE or V-UE) may be identified, and the MAC layer can determine whether the MAC SDU included in the MAC PDU is SL service data for a P-UE or SL service data for a V-UE. For example, a base station may transfer SL logical channel (SL LCH) or SL logical channel group (SL LCG) and mapped UE type (P-UE or V-UE) information to a UE through an RRC message, or pre-configuration.

Figure 8:
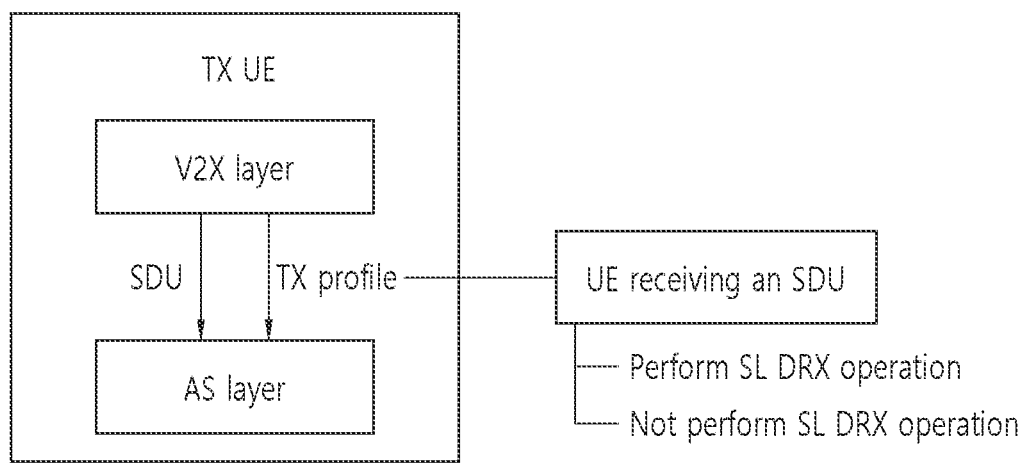
FIG. 8 shows an example in which a transmitting UE determines whether a UE receiving an SDU performs an SL DRX operation based on a transmission profile, according to an embodiment of the present disclosure.

FIG. 8 shows an example in which a transmitting UE determines whether a UE receiving an SDU performs an SL DRX operation based on a transmission profile, according to an embodiment of the present disclosure. The embodiment of FIG. 8 may be combined with various embodiments of the present disclosure.

Referring to FIG. 8, a transmission UE including a V2X layer and an AS layer appears. For example, the V2X layer may deliver an SDU and a TX profile related to the SDU to the AS layer. For example, the TX profile may include information related to whether a UE receiving the SDU performs the SL DRX operation. For example, the AS layer of the transmitting UE may determine that the receiving UE to receive the SDU performs the SL DRX operation, based on the transmission profile. Alternatively, the AS layer of the transmitting UE may determine that the receiving UE to receive the SDU does not perform the SL DRX operation, based on the transmission profile.

Figure 9:
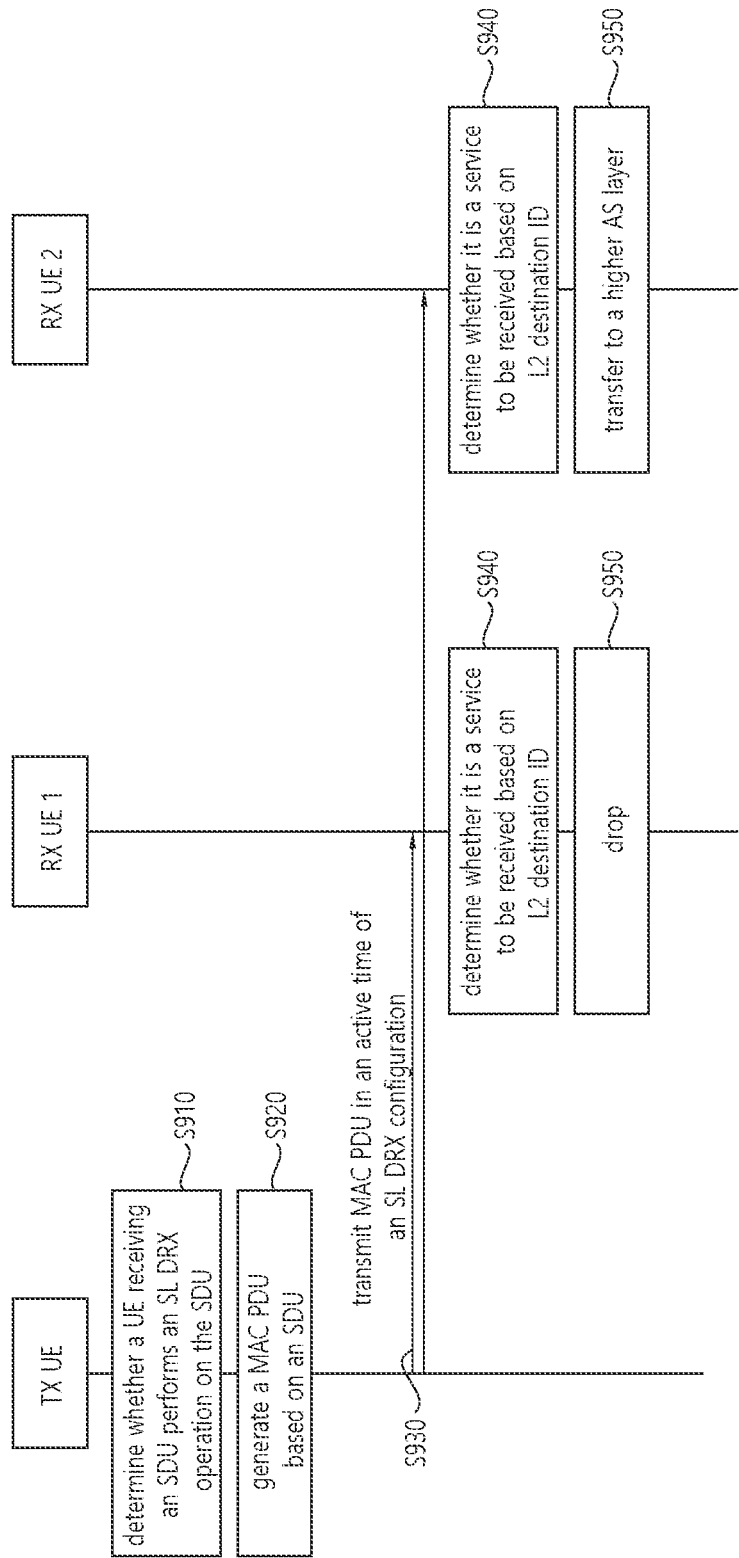
FIG. 9 shows an example in which a transmitting UE generates and transmits a MAC PDU based on an SL DRX configuration according to an embodiment of the present disclosure.

FIG. 9 shows an example in which a transmitting UE generates and transmits a MAC PDU based on an SL DRX configuration according to an embodiment of the present disclosure. The embodiment of FIG. 9 may be combined with various embodiments of the present disclosure.

Referring to FIG. 9, in step S910, a transmitting UE may determine whether a UE receiving an SDU performs an SL DRX operation on the SDU. In step S920, the transmitting UE may generate a MAC PDU based on the SDU. In step S930, the transmitting UE may transmit the MAC PDU in a groupcast or broadcast method. For example, the transmitting UE may transmit the MAC PDU to a receiving UE 1 and a receiving UE 2. In step S940, the receiving UE 1 and the receiving UE 2 may determine whether the MAC PDU is a MAC PDU related to a service to be received, based on the L2 destination ID included in the received MAC PDU. In step S950, the receiving UE 1 may determine that the MAC PDU is not a MAC PDU related to a service it desires, based on the L2 destination ID, and may drop the MAC PDU. The receiving UE 2 may determine that the MAC PDU is a MAC PDU related to the service it wants, based on the L2 destination ID, and the MAC PDU may be delivered from a lower layer of the receiving UE 2 to a higher AS layer.

According to an embodiment of the present disclosure, the higher layer (for example, V2X layer) of a UE may deliver an L2 destination ID related to the service (for example, PSID, ITS-AID) for a P-UE (or V-UE) to an AS layer. In addition, for example, L2 destination ID table information mapped with a service (for example, PSID, ITS-AID) for P-UE (or V-UE) may be preconfigured, and when the AS layer receives the L2 destination ID related to the service (for example, PSID, ITS-AID) for the P-UE (or V-UE) from the higher layer (for example, V2X layer), the AS layer may distinguish whether the L2 destination ID received from the V2X layer based on preconfigured table (L2 destination ID table mapped with service (for example, PSID, ITS-AID) for P-UE (or V-UE)) information is an L2 destination ID for a service of a P-UE or an L2 destination ID for a service of a V-UE.

According to an embodiment of the present disclosure, when a higher layer (for example, V2X layer) of a UE delivers an L2 destination ID to an AS layer, a distinguisher (For example, P-UE L2 destination ID indicator: For example, if the value is 0→An indicator indicating that L2 destination ID delivered by the V2X layer is an L2 destination ID to distinguish SL data or SL service that V-UE should receive. If the value is 1→An indicator indicating that L2 destination ID delivered by the V2X layer is an L2 destination ID to distinguish SL data or SL service that P-UE should receive.) capable of distinguishing whether this L2 destination ID is an L2 destination ID for a P-UE or an L2 destination ID for a V-UE may be transmitted.

For example, if a receiving UE (for example, P-UE) is interested in receiving SL data for a P-UE, when the receiving UE receives an SL data transmitted by a transmitting UE and determines that an L2 destination ID of the SL data is an L2 destination ID for a V-UE, the MAC layer of the receiving UE may filter and drop the corresponding SL data (SL packet or SL PDU), and may not deliver the corresponding SL data (SL packet or SL PDU) to the higher AS layer (RLC/PDCP layer).

Conversely, for example, if a receiving UE (for example, P-UE) is interested in receiving SL data for a P-UE, when the receiving UE receives an SL data transmitted by a transmitting UE and determines that an L2 destination ID of the SL data is the L2 destination ID for a P-UE, the MAC layer of the receiving UE may deliver the corresponding SL data (SL packet or SL PDU) to an higher AS layer (RLC/PDCP layer).

For example, when a transmitting UE includes a MAC SDU in a MAC PDU based on this, the transmitting UE may determine whether to trigger resource reselection based on re-evaluation, preemption, congestion control, and UL/SL (or NR SL/LTE SL) prioritization, in the process of selecting a transmission resource for transmitting the MAC PDU after determining whether the MAC SDU is a MAC SDU for a P-UE or a MAC SDU for a V-UE (or, after determining whether the MAC PDU is an SL data for a P-UE or an SL data for a V-UE, by checking the L2 destination ID in the process of generating the MAC PDU (for example, LCP)).

For example, through (pre) configuration, whether the related SL data is a target of a power saving UE (and/or an SL DRX operation UE) may be configured per priority (and/or PQI, and/or (L1 or L2) source (and/or destination) ID (pair) and/or sensing type (for example, partial sensing, full sensing, no sensing) and/or or resource selection type (for example, random resource selection, (partial or full) sensing-based resource selection)).

Proposal 2. Method of Operating a Transmitting UE According to a UE Type of the Transmitting UE According to an embodiment of the present disclosure, when a UE type of a transmitting UE transmitting an SL data is a P-UE, in a process of transmitting a MAC PDU or selecting a transmission resource for transmitting the MAC PDU, the transmitting UE may not trigger resource reselection based on re-evaluation, preemption and congestion control, and UL/SL (or SL/SL) prioritization.

In addition, for example, when a UE type of a transmitting UE transmitting an SL data is a V-UE, in a process of transmitting a MAC PDU or selecting a transmission resource for transmitting the MAC PDU, the transmitting UE may trigger resource reselection based on re-evaluation, preemption and congestion control, and UL/SL (or SL/SL) prioritization.

According to an embodiment of the present disclosure, when a transmission UE performs resource selection based on partial sensing or random selection in an SL resource pool (for example, transmission normal pool), resource reselection based on reevaluation, preemption and congestion control, and UL/SL (or SL/SL) prioritization may not be triggered, in a process of the transmitting UE transmitting a MAC PDU or in a process of selecting a transmission resource for transmitting a MAC PDU.

In addition, for example, when a transmission UE performs resource selection based on partial sensing or random selection in an SL resource pool (for example, transmission normal pool), a method in which SL data (PSCCH/PSSCH) transmission is dropped in a transmission resource location indicated in previous SCI before resource reselection is triggered even if preemption and congestion control and resource reselection based on UL/SL (or SL/SL) prioritization are not triggered is proposed, in a process of the transmitting UE transmitting a MAC PDU or in a process of selecting a transmission resource for transmitting a MAC PDU.

In addition, for example, when a transmission UE performs pool sensing-based resource selection from an SL resource pool (for example, transmission normal pool), resource reselection based on reevaluation, preemption and congestion control, and UL/SL (or SL/SL) prioritization may be triggered, in a process of the transmitting UE transmitting a MAC PDU or in a process of selecting a transmission resource for transmitting a MAC PDU.

Proposal 3. A method is proposed that a transmitting UE operating in NR resource allocation mode 2, when a UE performing reception is a P-UE (power saving UE) (or when a service type (PSID, ITS-AID) mapped to the destination L2 ID of the transmitting UE is a service type for the P-UE), doesn't trigger resource reselection based on preemption, congestion control and UL/SL (or SL/SL) prioritization. For example, in the conventional NR resource allocation mode 2 operation, when there are a plurality of MAC PDUs to be transmitted, a UE may perform resource reservation in a plurality of periods. In addition, the transmitting UE may transmit a MAC PDU by using one of the resources reserved in a plurality of periods for each MAC PDU transmission.

When the present disclosure (a method is proposed that a transmitting UE operating in NR resource allocation mode 2, when a UE performing reception is a P-UE (power saving UE) (or when a service type (PSID, ITS-AID) mapped to the destination L2 ID of the transmitting UE is a service type for the P-UE), doesn't trigger resource reselection based on preemption, congestion control and UL/SL (or SL/SL) prioritization.) is applied to the conventional NR resource allocation mode 2, the following operations may be possible.

According to an embodiment of the present disclosure, a plurality of MAC PDUs to be transmitted by a transmitting UE may include a MAC PDU in which a target receiving UE is a P-UE, and may also include a MAC PDU in which a target receiving UE is a V-UE (vehicle-UE). For example, since a V-UE may be a UE that does not perform a power saving operation, and since a P-UE is a UE performing a power saving operation, there may be differences in the reception operations of SL MAC PDU, transmitted by the transmitting UE, between the V-UE and the P-UE.

For example, in a resource selection procedure for a transmitting UE to transmit a MAC PDU to a P-UE, if an operation of triggering resource reselection based on reevaluation, preemption and congestion control and UL/SL (or SL/SL) prioritization is supported, a P-UE may have to receive not only SCI including resource information reserved for initial MAC PDU transmission, but also SCI including resource information reselected since a resource reselection based on preemption, congestion control and UL/SL (or, SL/SL) prioritization is triggered. That is, a P-UE performing an SL DRX operation for power saving may have to operate in an active state (if it was in a sleep mode, it should transition to an active mode to receive SCI), in order to receive the SCI including resource information reserved for transmission of the first MAC PDU by the transmitting UE. In addition, when a transmitting UE transmits SCI including resource information reselected by triggering resource reselection based on preemption, congestion control, and UL/SL (or SL/SL) prioritization to a P-UE, there may be a problem in that a P-UE needs to operate again for the active time (if the P-UE is in the sleep mode, it must transition to the active mode to receive the SCI) in order to receive the SCI.

Conversely, for example, since a V-UE does not support a power saving operation (i.e., always operates in the active time), SCI transmitted by a transmitting UE can be always monitored. Therefore, since a V-UE always exists in the active time, the V-UE can receive SCI without any problem, even if the transmitting UE triggers resource reselection based on re-evaluation, preemption and congestion control and UL/SL (or SL/SL) prioritization to transmit the SCI including the reselected resource.

Accordingly, in the present disclosure, to ensure the power-saving gain of a P-UE, a transmitting UE operating in NR resource allocation mode 2, when a UE performing reception is a P-UE (power saving UE) (or when a service type (PSID, ITS-AID) mapped with the destination L2 ID of the transmitting UE is a service type for a P-UE), may prevent resource reselection based on preemption, congestion control and UL/SL prioritization from being triggered, in a process of the transmitting UE transmitting a MAC PDU or in a process of selecting a transmission resource for transmitting a MAC PDU. That is, for example, the selected/reserved resource related to the MAC PDU in which the transmitting UE transmits the P-UE to the target may be a resource in which resource reselection based on preemption, congestion control, and UL/SL (or SL/SL) prioritization is not performed.

For example, the proposed method of the present disclosure may be extended to be equally applicable even when the opposite receiving UE of the transmitting UE is a V-UE.

In addition, for example, when a receiving UE of a transmitting UE includes both a V-UE and a P-UE (when a V-UE and a P-UE are included among receiving UEs that are destinations of a plurality of MAC PDUs transmitted by a transmitting UE, or when a MAC PDU includes both service (for example, PSID, ITS-AID or Destination L2 ID) data for V-UE and service (for example, PSID, ITS-AID or Destination L2 ID) data for P-UE, or when a transmitting UE has a destination L2 ID mapped with a service type (PSID, ITS-AID) for a P-UE and a destination L2 ID mapped with a service type (PSID, ITS-AID) for a V-UE at the same time), a transmission UE operating in NR resource allocation mode 2 may not trigger resource reselection based on preemption, congestion control, and UL/SL (or SL/SL) prioritization. For example, a selected/reserved resource related to a MAC PDU transmitted by a transmitting UE to a target P-UE may be a resource in which resource reselection based on preemption, congestion control, and UL/SL prioritization is not performed.

Alternatively, for example, when a receiving UE of a transmitting UE includes both a V-UE and a P-UE (when a V-UE and a P-UE are included among receiving UEs that are destinations of a plurality of MAC PDUs transmitted by a transmitting UE, or when a MAC PDU includes both service (for example, PSID, ITS-AID or Destination L2 ID) data for V-UE and service (for example, PSID, ITS-AID or Destination L2 ID) data for P-UE, or when a transmitting UE has a destination L2 ID mapped with a service type (PSID, ITS-AID) for a P-UE and a destination L2 ID mapped with a service type (PSID, ITS-AID) for a V-UE at the same time), a transmission UE operating in NR resource allocation mode 2 may trigger resource reselection based on preemption, congestion control and UL/SL (or SL/SL) prioritization and transmits the reselected resource to a receiving UE (P-UE and V-UE) through SCI, so that the receiving UE can use the resource reselected by the transmitting UE.

Proposal 4. Through the proposal of this disclosure, it may be determined whether to perform resource reselection based on preemption, congestion control, and UL/SL prioritization (the operation of dropping a transmission with the lower transmission priority when UL transmission and SL transmission occur at the same time. That is, the operation of transmitting the data with the higher priority of the transmission data first.) (Or SL/SL: the operation of dropping the sidelink transmission with the lower transmission priority, when there are multiple SL transmissions at the same time. That is, the operation of transmitting the data with the higher priority of the transmission data first.), according to whether a UE type (P-UE or V-UE) of a transmitting UE or a service type (PSID, ITS-AID or destination L2 ID) of SL data transmitted from a transmitting UE is for a service for P-UE or a service for V-UE, or according to a UE type (P-UE or V-UE) of a receiving UE, in a process of transmitting a MAC PDU or in a process of selecting a transmission resource for transmitting a MAC PDU. For example, in support of the proposed action above, a method is proposed for a base station to divide and allocate an SL resource pool into a resource pool for a P-UE (for example, a resource pool that does not support preemption operation) or a resource pool for a V-UE (for example, a resource pool that supports preemption operation) through a dedicated RRC message, a system information block (SIB) or a pre-configuration parameter as follows.

TABLE 5

SL-ResourcePool
The IE SL-ResourcePool specifies the configuration information
for NR sidelink communication resource pool.
SL-ResourcePool information element

```
-- ASN1START
-- TAG-SL-RESOURCEPOOL-START
SL-ResourcePool-r16 ::=      SEQUENCE {
  sl-PSCCH-Config-r16             SetupRelease { SL-PSCCH-Config-r16 }
                                  OPTIONAL,   -- Need M
  sl-PSSCH-Gonfig-r16             SetupRelease { SL-PSSCH-Config-r16 }
                                  OPTIONAL,   -- Need M
  ...,
    sl-FilterCoefficient-r16          FilterCoefficient
                                      OPTIONAL,   -- Need M
    sl-RB-Number-r16                  INTEGER (10..275)
                                      OPTIONAL,   -- Need M
    sl-PreemptionEnable-r16           ENUMERATED {enabled, pl1, pl2, pl3, pl4, pl5, pl6, pl7, pl8}
                                      OPTIONAL,   -- Need R
    sl-PriorityThreshold-UL-URLLC-r16 INTEGER (1..9)
                                      OPTIONAL,   -- Need M
    sl-PriorityThreshold-r16          INTEGER (1..9)
                                      OPTIONAL,   -- Need M
  ...,
  [[
  sl-TimeResource-r16           BIT STRING (SIZE (10..160))
                                OPTIONAL    -- Need M
  ]]
}
sl-PreemptionEnable
Indicates whether pre-emption is disabled or enabled in a resource pool.
If enabled, a priority level p_preemption can be optionally configured.
If the pre-emption is enabled but p_preemption is not configured,
pre-emption is applicable to all levels.
```

According to an embodiment of the present disclosure, when a UE receives an SL-resource pool allocated by a base station and sl-PreemptionEnable value is set to disabled, the UE may regard this resource pool as a resource pool for a P-UE, or when the sl-PreemptionEnable value is set to enabled, the UE may regard this resource pool as a resource pool for a V-UE.

Alternatively, for example, a resource pool for a P-UE and a V-UE may be clearly divided and allocated as follows.

TABLE 6

P-UE_SL-ResourcePool
The IE P-UE_SL-ResourcePool specifies the configuration information
for NR sidelink communication resource pool for P-UE.
P-UE_SL-ResourcePool information element

```
-- ASN1START
-- TAG-SL-RESOURCEPOOL-START
SL-ResourcePool-r16 ::=      SEQUENCE {
  sl-PSCCH-Config-r16             SetupRelease { SL-PSCCH-Config-r16 }
                                  OPTIONAL,   -- Need M
  sl-PSSCH-Config-r16             SetupRelease { SL-PSSCH-Config-r16 }
                                  OPTIONAL,   -- Need M
  ...,
    sl-FilterCoefficient-r16          FilterCoefficient
                                      OPTIONAL,   -- Need M
    sl-RB-Number-r16                  INTEGER (10..275)
                                      OPTIONAL,   -- Need M
    sl-PreemptionEnable-r16           ENUMERATED {enabled, pl1, pl2, pl3, pl4, pl5, pl6, pl7, pl8}
                                      OPTIONAL,   -- Need R
    sl-PriorityThreshold-UL-URLLC-r16 INTEGER (1..9)
                                      OPTIONAL,   -- Need M
    sl-PriorityThreshold-r16          INTEGER (1..9)
                                      OPTIONAL,   -- Need M
  ...,
  [[
  sl-TimeResource-r16           BIT STRING (SIZE (10..160))
                                OPTIONAL    -- Need M
  ]]
}
```

TABLE 7

V-UE_SL-ResourcePool
The IE V-UE_SL-ResourcePool specifies the configuration information
for NR sidelink communication resource pool for V-UE.
V-UE_SL-ResourcePool information element

```
-- ASN1START
-- TAG-SL-RESOURCEPOOL-START
SL-ResourcePool-r16 ::=        SEQUENCE {
    sl-PSCCH-Config-r16            SetupRelease { SL-PSCCH-Config-r
16 }                               OPTIONAL,  -- Need M
    sl-PSSCH-Config-r16            SetupRelease { SL-PSSCH-Config-r
16 }                               OPTIONAL,  -- Need M
    ...,
    sl-FilterCoefficient-r16       FilterCoefficient
                                   OPTIONAL,  -- Need M
    sl-RB-Number-r16               INTEGER (10..275)
                                   OPTIONAL,  -- Need M
    sl-PreemptionEnable-r16        ENUMERATED {enabled, pl1, pl2, p
l3, pl4, pl5, pl6, pl7, pl8}       OPTIONAL,  -- Need R
    sl-PriorityThreshold-UL-URLLC-r16  INTEGER (1..9)
                                   OPTIONAL,  -- Need M
    ...,
    [[
    sl-TimeResource-r16            BIT STRING (SIZE (10..160))
                                   OPTIONAL   -- Need M
    ]]
}
```

For example, in the above-mentioned proposals 1, 2, and 3, when it is determined that a UE does not perform preemption, the UE may select and use a resource pool in which sl-preemptionenable is set to disabled, and when it is determined that the UE performs preemption, the UE may select and use a resource pool in which sl-preemptionenable is set to enabled.

Alternatively, for example, in the above-mentioned proposals 1, 2, and 3, when it is determined that a UE does not perform preemption, the UE can select and use the P-UE_SL-resourcepool (For example, sl-preemptionenable is set to disabled), when it is determined that the UE performs preemption, the UE may select and use V-UE_SL-resourcepool (For example, sl-preemptionenable is set to enabled).

The following SL DRX configurations and SL DRX timers mentioned in the present disclosure may be used for the following purposes.

TABLE 8

Sidelink DRX configurations
SL drx-onDurationTimer: the duration at the beginning of a SL DRX Cycle;
SL drx-SlotOffset: the delay before starting the sl drx-onDurationTimer;
SL drx-InactivityTimer; the duration after the PSCCH occasion in which a PSCCH indicates a new SL transmission for the MAC entity;
SL drx-StartOffset: the subframe where the SL DRX cycle start;
SL drx-Cycle: the SL DRX cycle;
SL drx-HARQ-RTT-Timer (per HARQ process or per sidelink process): the minimum duration before an assignment for HARQ retransmission is expected by the MAC entity.
SL drx-RetransmissionTimer (per HARQ process or per sidelink process): the maximum duration until a retransmission is received SL DRX on-duration timer: It may indicate a period in which a UE performing SL DRX operation should basically operate as an active time in order to receive PSCCH/PSSCH of a counterpart UE.

SL DRX inactivity timer: It may indicate a period in which a UE performing SL DRX operation extends the SL DRX on-duration period, which is a period in which an active time is basically required to receive PSCCH/PSSCH of a counterpart UE. That is, the SL DRX on-duration timer may be extended by the SL DRX inactivity timer period. In addition, when a UE receives a new packet (new PSSCH transmission) from a counterpart UE, the UE may extend the SL DRX on-duration timer by starting the SL DRX inactivity timer.

SL DRX HARQ RTT timer: It may indicate a period in which a UE performing SL DRX operation operates in a sleep mode until it receives a retransmission packet (or PSSCH allocation) transmitted from a counterpart UE. That is, when a UE starts the SL DRX HARQ RTT timer, the UE may determine that the other UE will not transmit a sidelink retransmission packet to itself until the SL DRX HARQ RTT timer expires, and may operate in sleep mode during the timer is running.

SL DRX retransmission timer: It may indicate a period in which a UE performing SL DRX operation operates as an active time to receive a retransmission packet (or PSSCH allocation) transmitted by a counterpart UE. During the corresponding timer period, a UE may monitor reception of a retransmission sidelink packet (or PSSCH allocation) transmitted by a counterpart UE.

For example, in the following description, names of timers (SL DRX on-duration timer, SL DRX inactivity timer, SL DRX HARQ RTT timer, SL DRX retransmission timer, etc.) are exemplary, and a timer performing the same/similar function based on the description of each timer may be regarded as the same/similar timer regardless of its name.

For example, the proposal of the present disclosure is a solution that can be applied and expanded as a method to solve a problem in which loss occurs due to interference occurring during Uu Bandwidth Part (BWP) switching.

In addition, for example, it is a solution that can be applied and expanded as a method to solve the problem of loss due to interference that occurs during SL BWP switching when a UE supports SL multiple BWP (bandwidth part).

For example, the proposal of the present disclosure may be extended and applied to parameters (and timers), parameters (and timers) included in UE-pair specific SL DRX configuration or UE-pair specific SL DRX pattern or UE-pair specific SL DRX configuration, etc., in addition to parameters (and timers) included in the default/common SL DRX configuration or the default/common SL DRX pattern or the default/common SL DRX configuration.

In addition, for example, the on-duration term mentioned in the proposal of the present disclosure may be extended and interpreted as an active time interval, and the off-duration term may be extended and interpreted as a sleep time interval. For example, the active time may mean a period in which a UE operates in a wake up state (RF module is On) in order to receive/transmit a wireless signal. For example, sleep time may mean a section in which a UE operates in a sleep mode state (RF module is Off) for power saving. For example, the sleep time period does not mean that a transmitting UE is obliged to operate in the sleep mode. That is, if necessary, even in the sleep time period, a UE may be permitted to operate for a short time in the active time to perform a sensing operation/transmission operation.

In addition, for example, whether the (part of) proposed method/rule of the present disclosure is applied and/or related parameters (for example, threshold value) may be configured specifically (or differently, or independently), according to a resource pool, congestion level, service priority (and/or a type), requirements (for example, delay, reliability), traffic type (for example, (non) periodic generation), SL transmission resource allocation mode (mode 1, mode 2)), etc.

For example, whether the proposed rule of the present disclosure is applied (and/or related parameter setting values) may be configured specifically (and/or independently, and/or differently), for at least one of a resource pool, service/packet type (and/or priority), QoS requirements (for example, URLLC/EMBB traffic, reliability, delay), cast type (for example, unicast, groupcast, broadcast), (resource pool) congestion level (for example, CBR), SL HARQ feedback method (for example, NACK only feedback, ACK/NACK feedback), a case of HARQ feedback enabled MAC PDU transmission (and/or HARQ feedback disabled MAC PDU), whether a PUCCH-based SL HARQ feedback reporting operation is configured, pre-emption (and/or re-evaluation) performing (or based resource reselection), (L2 or L1) (source and/or destination) identifier, (L2 or L1) (combination of source layer ID and destination layer ID) identifier, (L2 or L1) (source layer ID and destination layer ID and cast type) combination of identifier, source layer ID and destination layer ID pair direction, PC5 RRC connection/link, SL mode type (resource allocation mode 1, resource allocation mode 2 when SL DRX is performed)), a case that (non) periodic resource reservation is performed.

For example, a term of certain time mentioned in the proposals of this disclosure may indicate a time during which a UE operates as an active time for a predefined time to receive a sidelink signal or sidelink data from a counterpart UE, or a time that operates as an active time as long as a time or a specific timer (SL DRX retransmission timer, SL DRX inactivity timer, or a timer that guarantees to operate as active time in the DRX operation of a receiving UE).

In addition, for example, whether the proposal of the present disclosure and the proposal rule apply (and/or related parameter setting values) may also be applied to the mmWave SL operation.

According to an embodiment of the present disclosure, a transmitting UE can know whether a UE receiving an SDU performs an SL DRX operation, and when the transmitting UE transmits the SDU during an active time of an SL DRX configuration related to the SL DRX operation, the UEs receiving the SDU can receive the SDU without omission.

Figure 10:
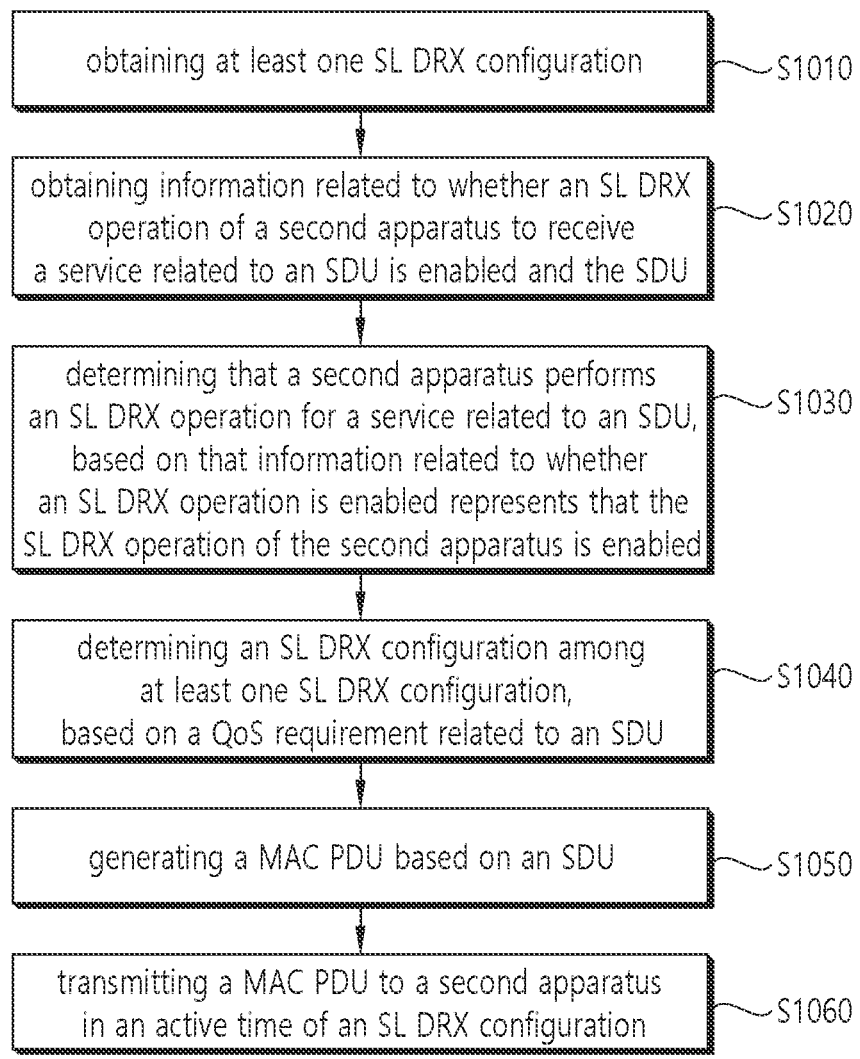
FIG. 10 shows a procedure in which a first apparatus performs wireless communication, according to an embodiment of the present disclosure.

FIG. 10 shows a procedure in which a first apparatus performs wireless communication, according to an embodiment of the present disclosure. The embodiment of FIG. 10 may be combined with various embodiments of the present disclosure.

Referring to FIG. 10, in step S1010, a first apparatus performing wireless communication may obtain at least one sidelink (SL) discontinuous reception (DRX) configuration. In step S1020, the first apparatus may obtain information related to whether an SL DRX operation of a second apparatus to receive a service related to a service data unit (SDU) is enabled and the SDU. In step S1030, the first apparatus may determine that the second apparatus performs an SL DRX operation for the service related to the SDU, based on that the information related to whether the SL DRX operation is enabled represents that an SL DRX operation of the second apparatus is enabled. In step S1040, the first apparatus may determine an SL DRX configuration among the at least one SL DRX configuration, based on a quality of service (QoS) requirement related to the SDU. In step S1050, the first apparatus may generate a medium access control (MAC) protocol data unit (PDU) based on the SDU. In step S1060, the first apparatus may transmit the MAC PDU to the second apparatus in an active time of the SL DRX configuration. For example, the SL DRX configuration may include information related to an SL DRX cycle and information related to a timer related to the active time.

For example, an operation of obtaining the information related to whether an SL DRX operation is enabled and the SDU may include: receiving the information related to whether an SL DRX operation is enabled and the SDU from a higher layer.

For example, the information related to whether an SL DRX operation is enabled and the SDU may be received to an access stratum (AS) layer of the first apparatus.

For example, the higher layer may be a vehicle to everything (V2X) layer.

For example, the information related to whether an SL DRX operation is enabled may include a mapping relationship between a logical channel (LCH) on which the SDU is received and the enabling of an SL DRX operation of the second apparatus.

For example, additionally, the first apparatus may receive the mapping relationship from a base station through a radio resource control (RRC) message.

For example, the mapping relationship may be pre-configured to the first apparatus.

For example, the information related to whether an SL DRX operation is enabled may include a layer 2 (L2) destination identifier (ID) related to the service related to the SDU.

For example, the information related to whether an SL DRX operation is enabled may include information which represents whether the L2 destination ID represents that an SL DRX operation of the second apparatus is enabled.

For example, the SDU may be an SDU related to a groupcast or a broadcast.

For example, the service related to the SDU may include at least one of a provider service identifier (PSID) or an intelligent transport system-application identifier (ITS-AID).

For example, the MAC PDU may be transferred to a higher layer from the second apparatus, based on that the information related to whether an SL DRX operation is enabled represents that an SL DRX operation of the second apparatus is enabled.

For example, the higher layer may include at least one of an RLC layer or a PDCP layer.

The above-described embodiment may be applied to various apparatuses to be described below. For example, a processor 102 of a first apparatus 100 may obtain at least one sidelink (SL) discontinuous reception (DRX) configuration. And, the processor 102 of the first apparatus 100 may obtain information related to whether an SL DRX operation of a second apparatus 200 to receive a service related to a service data unit (SDU) is enabled and the SDU. And, the processor 102 of the first apparatus 100 may determine that the second apparatus 200 performs an SL DRX operation for the service related to the SDU, based on that the information related to whether the SL DRX operation is enabled represents that an SL DRX operation of the second apparatus 200 is enabled. And, the processor 102 of the first apparatus 100 may determine an SL DRX configuration among the at least one SL DRX configuration, based on a quality of service (QoS) requirement related to the SDU. And, the processor 102 of the first apparatus 100 may generate a medium access control (MAC) protocol data unit (PDU) based on the SDU. And, the processor 102 of the first apparatus 100 may control a transceiver 106 to transmit the MAC PDU to the second apparatus 200 in an active time of the SL DRX configuration. For example, the SL DRX configuration may include information related to an SL DRX cycle and information related to a timer related to the active time.

According to an embodiment of the present disclosure, a first apparatus for performing wireless communication may be proposed. For example, the first apparatus may comprise: one or more memories storing instructions; one or more transceivers; and one or more processors connected to the one or more memories and the one or more transceivers. For example, the one or more processors may execute the instructions to: obtain at least one sidelink (SL) discontinuous reception (DRX) configuration; obtain information related to whether an SL DRX operation of a second apparatus to receive a service related to a service data unit (SDU) is enabled and the SDU; determine that the second apparatus performs an SL DRX operation for the service related to the SDU, based on that the information related to whether the SL DRX operation is enabled represents that an SL DRX operation of the second apparatus is enabled; determine an SL DRX configuration among the at least one SL DRX configuration, based on a quality of service (QoS) requirement related to the SDU; generate a medium access control (MAC) protocol data unit (PDU) based on the SDU; and transmit the MAC PDU to the second apparatus in an active time of the SL DRX configuration, wherein the SL DRX configuration includes information related to an SL DRX cycle and information related to a timer related to the active time.

According to an embodiment of the present disclosure, an apparatus configured to control a first user equipment (UE) may be proposed. For example, the apparatus may comprise: one or more processors; and one or more memories operably connectable to the one or more processors and storing instructions. For example, the one or more processors may execute the instructions to: obtain at least one sidelink (SL) discontinuous reception (DRX) configuration; obtain information related to whether an SL DRX operation of a second UE to receive a service related to a service data unit (SDU) is enabled and the SDU; determine that the second UE performs an SL DRX operation for the service related to the SDU, based on that the information related to whether the SL DRX operation is enabled represents that an SL DRX operation of the second UE is enabled; determine an SL DRX configuration among the at least one SL DRX configuration, based on a quality of service (QoS) requirement related to the SDU; generate a medium access control (MAC) protocol data unit (PDU) based on the SDU; and transmit the MAC PDU to the second UE in an active time of the SL DRX configuration, wherein the SL DRX configuration includes information related to an SL DRX cycle and information related to a timer related to the active time.

According to an embodiment of the present disclosure, a non-transitory computer-readable storage medium storing instructions may be proposed. For example, the instructions, when executed, may cause a first apparatus to: obtain at least one sidelink (SL) discontinuous reception (DRX) configuration; obtain information related to whether an SL DRX operation of a second apparatus to receive a service related to a service data unit (SDU) is enabled and the SDU; determine that the second apparatus performs an SL DRX operation for the service related to the SDU, based on that the information related to whether the SL DRX operation is enabled represents that an SL DRX operation of the second apparatus is enabled; determine an SL DRX configuration among the at least one SL DRX configuration, based on a quality of service (QoS) requirement related to the SDU; generate a medium access control (MAC) protocol data unit (PDU) based on the SDU; and transmit the MAC PDU to the second apparatus in an active time of the SL DRX configuration, wherein the SL DRX configuration includes information related to an SL DRX cycle and information related to a timer related to the active time.

Figure 11:
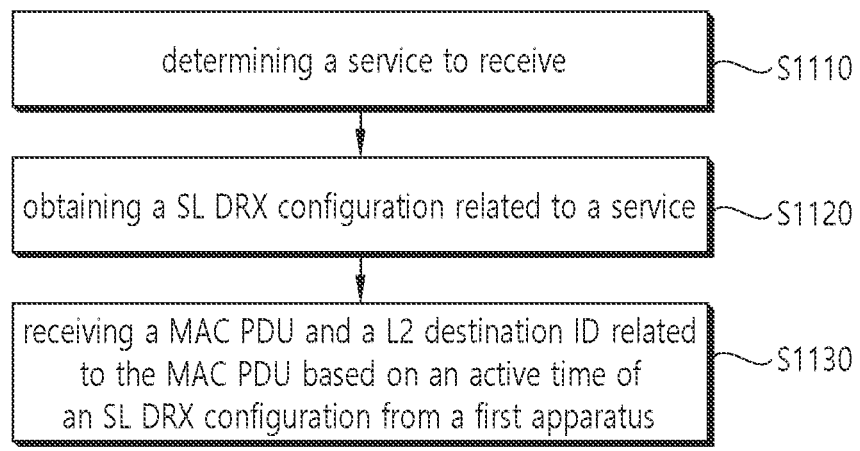
FIG. 11 shows a procedure in which a second apparatus performs wireless communication, according to an embodiment of the present disclosure.

FIG. 11 shows a procedure in which a second apparatus performs wireless communication, according to an embodiment of the present disclosure. The embodiment of FIG. 11 may be combined with various embodiments of the present disclosure.

Referring to FIG. 11, in step S1110, a second apparatus performing wireless communication may determine a service to receive. In step S1120, the second apparatus may obtain a sidelink (SL) discontinuous reception (DRX) configuration related to the service. In step S1130, the second apparatus may receive a medium access control (MAC) protocol data unit (PDU) and a layer 2 (L2) destination identifier (ID) related to the MAC PDU based on an active time of the SL DRX configuration from a first apparatus. For example, the MAC PDU may be generated by the first apparatus based on a service data unit (SDU) related to the service. For example, the SL DRX configuration may be determined among at least one SL DRX configuration, based on a quality of service (QoS) requirement related to the SDU. For example, the MAC PDU and the L2 destination ID may be transmitted from the first apparatus based on the active time of the SL DRX configuration. For example, the SL DRX configuration may include information related to an SL DRX cycle and information related to a timer related to the active time.

For example, an operation of receiving the MAC PDU and the L2 destination ID related to the MAC PDU based on the active time of the SL DRX configuration from the first apparatus may include: receiving the MAC PDU and the L2 destination ID related to the MAC PDU; determining whether the L2 destination ID is related to the service; and transferring the MAC PDU to an access stratum (AS) layer based on that the L2 destination ID is related to the service.

The above-described embodiment may be applied to various apparatuses to be described below. For example, a processor 202 of a second apparatus 200 may determine a service to receive. And, the processor 202 of the second apparatus 200 may obtain a sidelink (SL) discontinuous reception (DRX) configuration related to the service. And the processor 202 of the second apparatus 200 may control a transceiver 206 to receive a medium access control (MAC) protocol data unit (PDU) and a layer 2 (L2) destination identifier (ID) related to the MAC PDU based on an active time of the SL DRX configuration from a first apparatus. For example, the MAC PDU may be generated by the first apparatus based on a service data unit (SDU) related to the service. For example, the SL DRX configuration may be determined among at least one SL DRX configuration, based on a quality of service (QoS) requirement related to the SDU. For example, the MAC PDU and the L2 destination ID may be transmitted from the first apparatus based on the active time of the SL DRX configuration. For example, the SL DRX configuration may include information related to an SL DRX cycle and information related to a timer related to the active time.

According to an embodiment of the present disclosure, a second apparatus for performing wireless communication may be proposed. For example, the second apparatus may comprise: one or more memories storing instructions; one or more transceivers; and one or more processors connected to the one or more memories and the one or more transceivers. For example, the one or more processors may execute the instructions to: determine a service to receive; obtain a sidelink (SL) discontinuous reception (DRX) configuration related to the service; and receive a medium access control (MAC) protocol data unit (PDU) and a layer 2 (L2) destination identifier (ID) related to the MAC PDU based on an active time of the SL DRX configuration from a first apparatus, wherein the MAC PDU is generated by the first apparatus based on a service data unit (SDU) related to the service, wherein the SL DRX configuration is determined among at least one SL DRX configuration, based on a quality of service (QoS) requirement related to the SDU, wherein the MAC PDU and the L2 destination ID are transmitted from the first apparatus based on the active time of the SL DRX configuration, and wherein the SL DRX configuration includes information related to an SL DRX cycle and information related to a timer related to the active time.

For example, the operation of receiving the MAC PDU and the L2 destination ID related to the MAC PDU based on the active time of the SL DRX configuration from the first apparatus may include: receiving the MAC PDU and the L2 destination ID related to the MAC PDU; determining whether the L2 destination ID is related to the service; and transferring the MAC PDU to an access stratum (AS) layer based on that the L2 destination ID is related to the service.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 12:
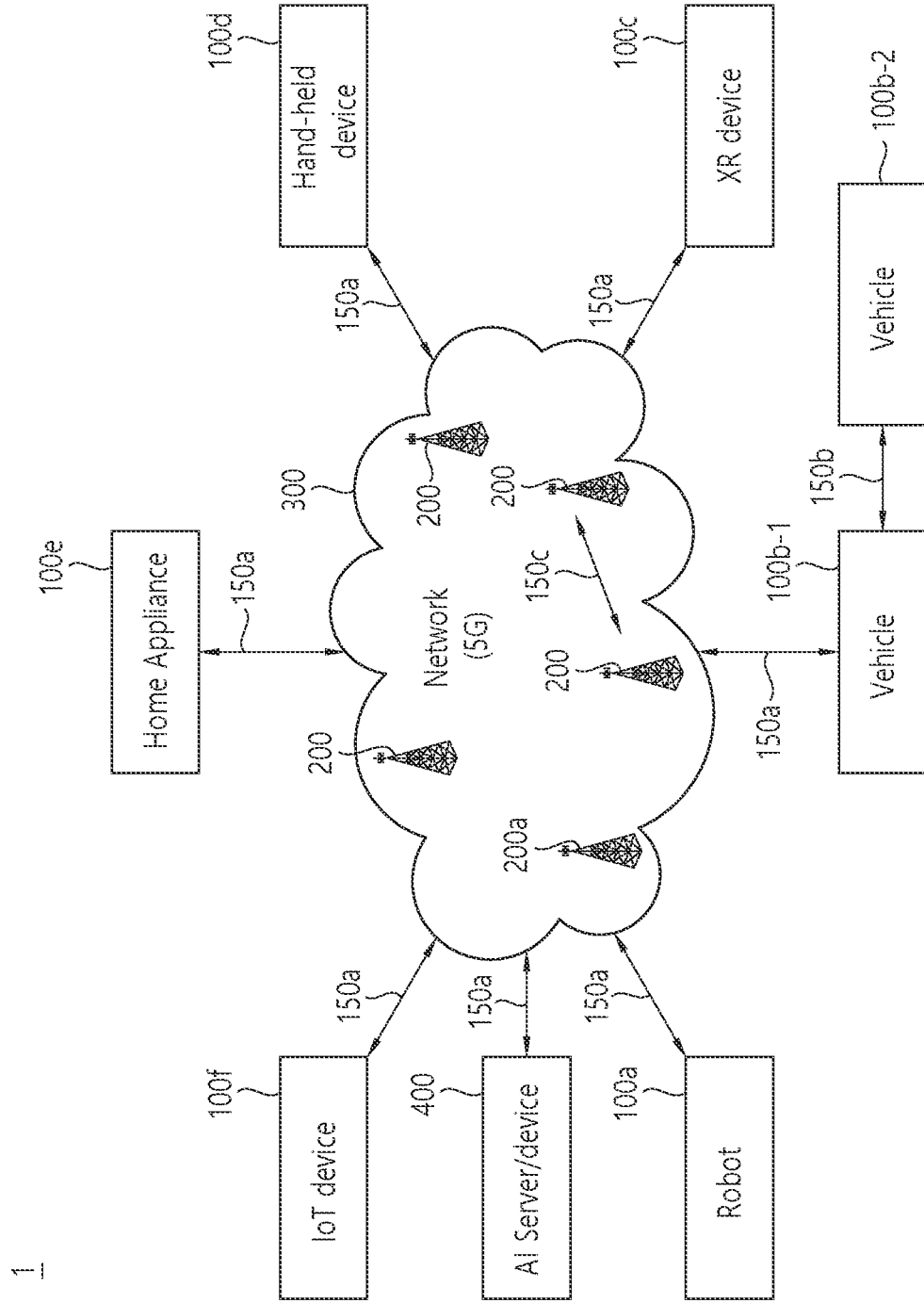
FIG. 12 shows a communication system 1, based on an embodiment of the present disclosure.

FIG. 12 shows a communication system 1, based on an embodiment of the present disclosure. The embodiment of FIG. 12 may be combined with various embodiments of the present disclosure.

Referring to FIG. 12, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
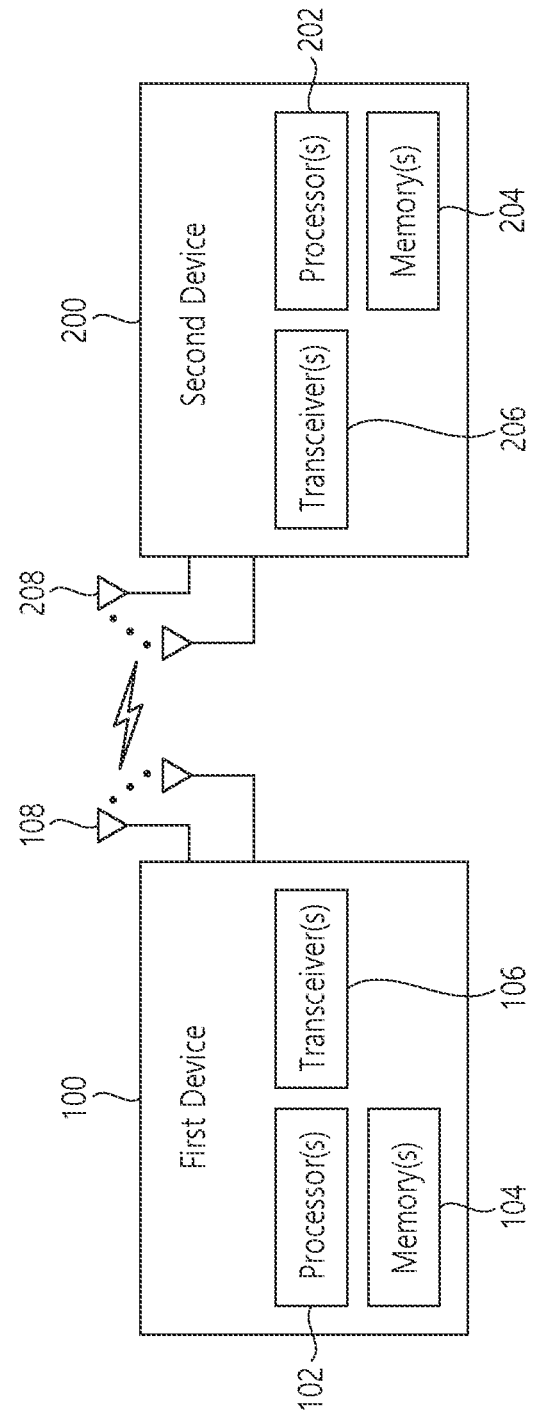
FIG. 13 shows wireless devices, based on an embodiment of the present disclosure.

FIG. 13 shows wireless devices, based on an embodiment of the present disclosure. The embodiment of FIG. 13 may be combined with various embodiments of the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
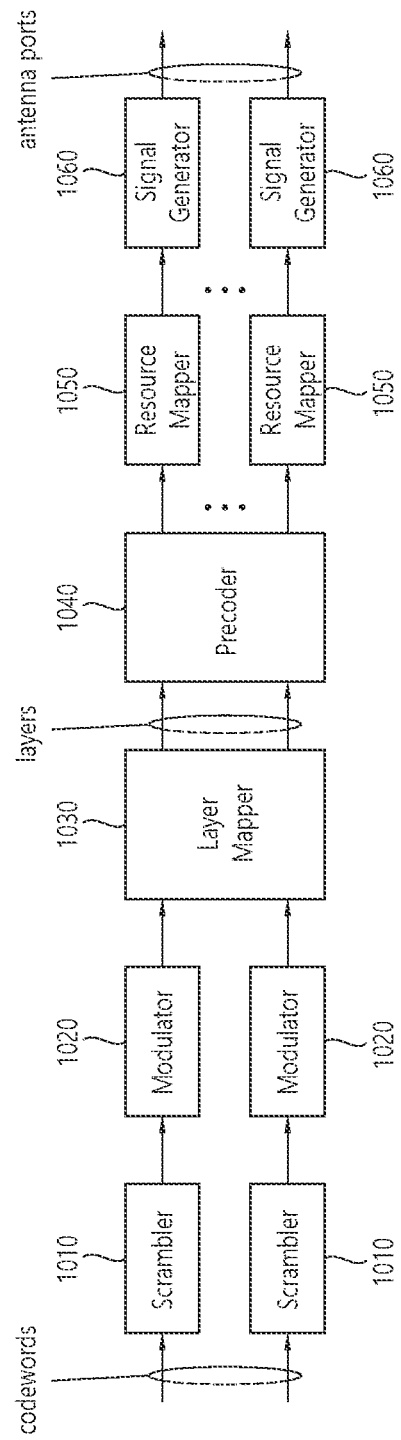
FIG. 14 shows a signal process circuit for a transmission signal, based on an embodiment of the present disclosure.

FIG. 14 shows a signal process circuit for a transmission signal, based on an embodiment of the present disclosure. The embodiment of FIG. 14 may be combined with various embodiments of the present disclosure.

Referring to FIG. 14, a signal processing circuit 1000 may include scramblers 1010, modulators 1020, a layer mapper 1030, a precoder 1040, resource mappers 1050, and signal generators 1060. An operation/function of FIG. 14 may be performed, without being limited to, the processors 102 and 202 and/or the transceivers 106 and 206 of FIG. 13. Hardware elements of FIG. 14 may be implemented by the processors 102 and 202 and/or the transceivers 106 and 206 of FIG. 13. For example, blocks 1010 to 1060 may be implemented by the processors 102 and 202 of FIG. 13. Alternatively, the blocks 1010 to 1050 may be implemented by the processors 102 and 202 of FIG. 13 and the block 1060 may be implemented by the transceivers 106 and 206 of FIG. 13.

Codewords may be converted into radio signals via the signal processing circuit 1000 of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 14. For example, the wireless devices (e.g., 100 and 200 of FIG. 13) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 15:
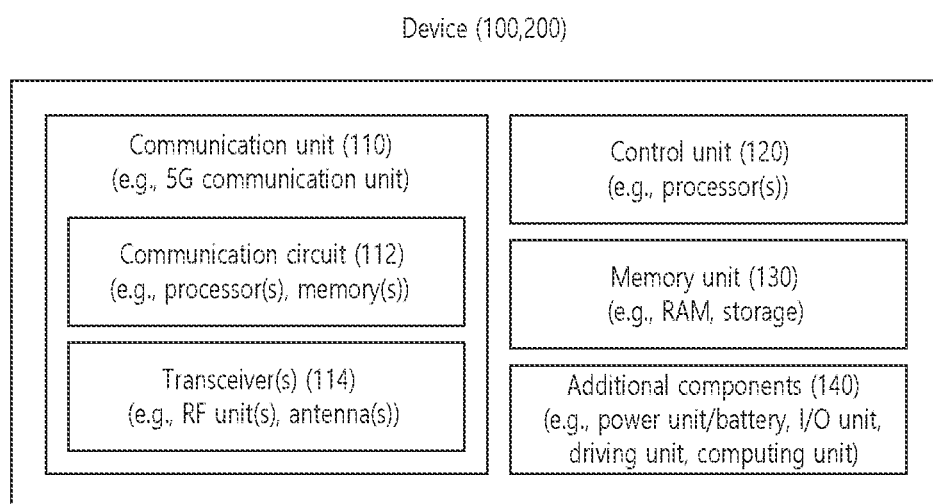
FIG. 15 shows another example of a wireless device, based on an embodiment of the present disclosure.

FIG. 15 shows another example of a wireless device, based on an embodiment of the present disclosure. The wireless device may be implemented in various forms according to a use-case/service (refer to FIG. 12). The embodiment of FIG. 15 may be combined with various embodiments of the present disclosure.

Referring to FIG. 15, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 15 will be described in detail with reference to the drawings.

Figure 16:
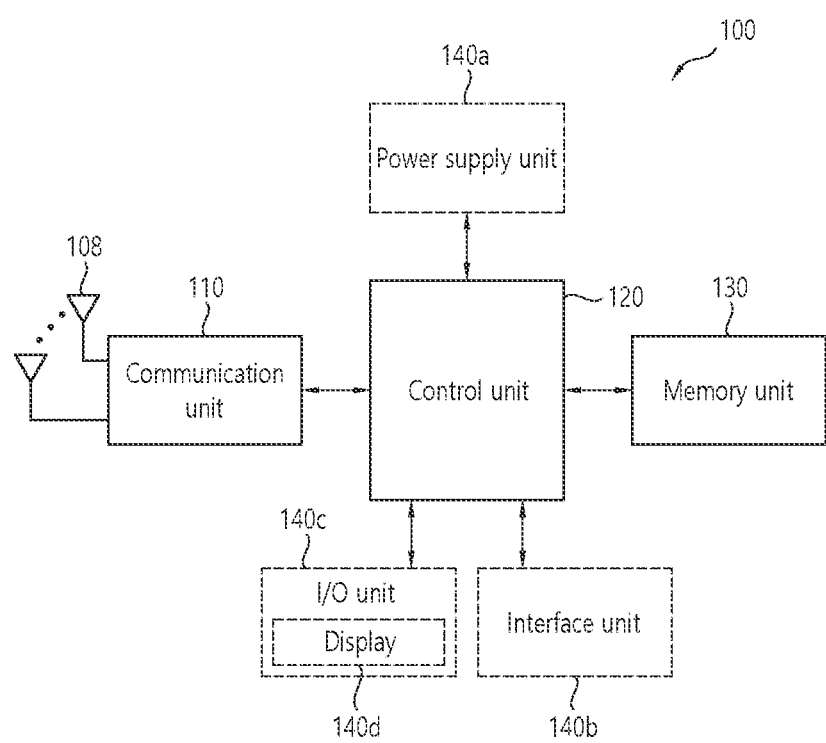
FIG. 16 shows a hand-held device, based on an embodiment of the present disclosure.

FIG. 16 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 16 may be combined with various embodiments of the present disclosure.

Referring to FIG. 16, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 15, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 17:
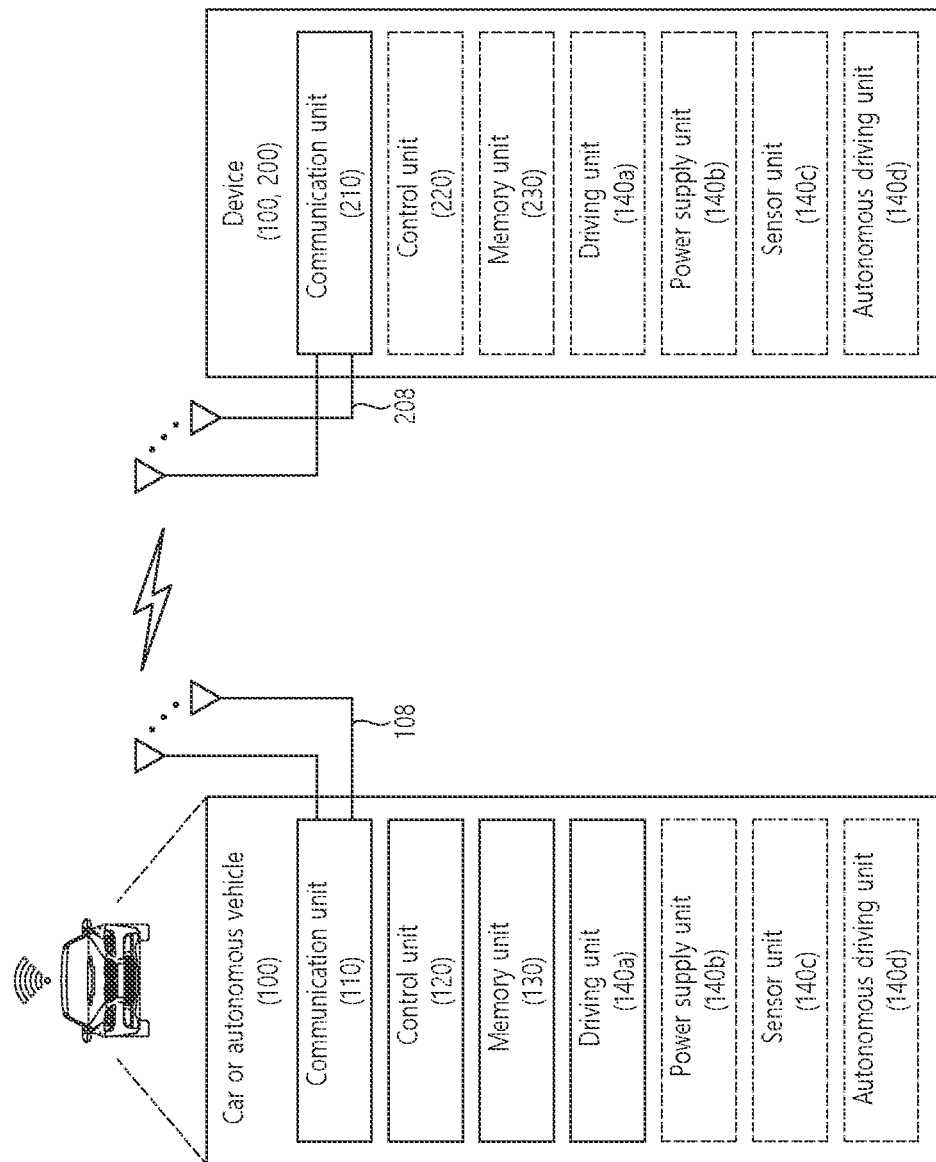
FIG. 17 shows a vehicle or an autonomous vehicle, based on an embodiment of the present disclosure.

FIG. 17 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 17 may be combined with various embodiments of the present disclosure.

Referring to FIG. 17, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, wireless communication, the method comprising:
   obtaining information related to at least one sidelink (SL) discontinuous reception (DRX) configuration and a destination ID;
   obtaining information related to whether an SL DRX operation of a second apparatus to receive a medium access control (MAC) protocol data unit (PDU) related to the destination ID is enabled;
   determining that the second apparatus performs a first SL DRX operation, based on the information related to whether the SL DRX operation is enabled;
   determining an SL DRX configuration among the at least one SL DRX configuration, based on a quality of service (QoS) requirement related to the MAC PDU;
   transmitting, to the second apparatus, first sidelink control information (SCI) for scheduling of a physical sidelink shared channel (PSSCH) through a physical sidelink control channel (PSCCH), in an active time of the SL DRX configuration; and
   transmitting, to the second apparatus, second SCI including the destination ID and the MAC PDU through the PSSCH in the active time of the SL DRX configuration,
   wherein the SL DRX configuration includes information related to an SL DRX cycle and information related to a timer related to the active time.

2. The method of claim 1, wherein obtaining the information related to whether an SL DRX operation is enabled and the destination ID includes:
   receiving the information related to whether an SL DRX operation is enabled and the destination ID from a higher layer.

3. The method of claim 2, wherein the information related to whether an SL DRX operation is enabled and the destination ID are received to an access stratum (AS) layer of the first apparatus.

4. The method of claim 2, wherein the higher layer is a vehicle to everything (V2X) layer.

5. The method of claim 2, wherein the information related to whether an SL DRX operation is enabled includes a mapping relationship between a logical channel (LCH) related to the destination ID and the enabling of an SL DRX operation of the second apparatus.

6. The method of claim 5, further comprising:
receiving the mapping relationship from a base station through a radio resource control (RRC) message.

7. The method of claim 5, wherein the mapping relationship is pre-configured to the first apparatus.

8. The method of claim 1, wherein the information related to whether an SL DRX operation is enabled is obtained based on the destination ID.

9. The method of claim 1, wherein the destination ID is related to a groupcast or a broadcast.

10. The method of claim 1, wherein the information related to whether an SL DRX operation is enabled includes at least one of a provider service identifier (PSID) or an intelligent transport system-application identifier (ITS-AID).

11. The method of claim 1, wherein the MAC PDU is transferred to a higher layer from the second apparatus, based on that the information related to whether an SL DRX operation is enabled.

12. The method of claim 11, wherein the higher layer includes at least one of an RLC layer or a PDCP layer.

13. A first apparatus for performing wireless communication, the first apparatus comprising:
one or more memories storing instructions;
one or more transceivers; and
one or more processors connected to the one or more memories and the one or more transceivers, wherein the one or more processors execute the instructions to:
obtain information related to at least one sidelink (SL) discontinuous reception (DRX) configuration and a destination ID;
obtain information related to whether an SL DRX operation of a second apparatus to receive a medium access control (MAC) protocol data unit (PDU) related to the destination ID;
determine that the second apparatus performs a first SL DRX operation, based on the information related to whether the SL DRX operation is enabled;
determine an SL DRX configuration among the at least one SL DRX configuration, based on a quality of service (QoS) requirement related to the MAC PDU;
transmit, to the second apparatus, first sidelink control information (SCI) for scheduling of a physical sidelink shared channel (PSSCH) through a physical sidelink control channel (PSCCH), in an active time of the SL DRX configuration; and
transmitting, to the second apparatus, second SCI including the destination ID and the MAC PDU through the PSSCH in the active time of the SL DRX configuration,
wherein the SL DRX configuration includes information related to an SL DRX cycle and information related to a timer related to the active time.

14. An apparatus configured to control a first user equipment (UE), the apparatus comprising:
one or more processors; and
one or more memories operably connectable to the one or more processors and storing instructions, wherein the one or more processors execute the instructions to:
obtain information related to at least one sidelink (SL) discontinuous reception (DRX) configuration and a destination ID;
obtain information related to whether an SL DRX operation of a second UE to receive a medium access control (MAC) protocol data unit (PDU) related to the destination ID;
determine that the second UE performs a first SL DRX operation, based on the information related to whether the SL DRX operation is enabled;
determine an SL DRX configuration among the at least one SL DRX configuration, based on a quality of service (QoS) requirement related to the MAC PDU;
transmit, to the second UE, first sidelink control information (SCI) for scheduling of a physical sidelink shared channel (PSSCH) through a physical sidelink control channel (PSCCH), in an active time of the SL DRX configuration; and
transmitting, to the second UE, second SCI including the destination ID and the MAC PDU through the PSSCH in the active time of the SL DRX configuration,
wherein the SL DRX configuration includes information related to an SL DRX cycle and information related to a timer related to the active time.

* * * * *